US012790426B2

(12) United States Patent
Abbaspourrad et al.

(10) Patent No.: US 12,790,426 B2
(45) Date of Patent: Nov. 10, 2026

(54) SYNTHESIS OF CROSS-LINKED SPHERICAL POLYCATIONIC BEAD ADSORBENTS FOR HEPARIN RECOVERY

(71) Applicant: CORNELL UNIVERSITY, Ithaca, NY (US)

(72) Inventors: Alireza Abbaspourrad, Ithaca, NY (US); Mojtaba Enayatinook, Ithaca, NY (US); Mahmood Karimi Abdolmaleki, Edinburg, TX (US)

(73) Assignee: CORNELL UNIVERSITY, Ithaca, NY (US)

( * ) Notice: Subject to any disclaimer, the term of this patent is extended or adjusted under 35 U.S.C. 154(b) by 1156 days.

(21) Appl. No.: 17/792,239

(22) PCT Filed: Jan. 13, 2021

(86) PCT No.: PCT/US2021/013262

§ 371 (c)(1),
(2) Date: Jul. 12, 2022

(87) PCT Pub. No.: WO2021/146301

PCT Pub. Date: Jul. 22, 2021

(65) Prior Publication Data

US 2023/0096993 A1 Mar. 30, 2023

Related U.S. Application Data

(60) Provisional application No. 62/960,513, filed on Jan. 13, 2020.

(51) Int. Cl.

| | |
|---|---|
| ***C08F 220/56*** | (2006.01) |
| ***B01J 20/26*** | (2006.01) |

(Continued)

(52) U.S. Cl.

CPC .......... *C08F 220/56* (2013.01); *B01J 20/261* (2013.01); *B01J 20/28054* (2013.01);

(Continued)

(58) Field of Classification Search

None

See application file for complete search history.

(56) References Cited

U.S. PATENT DOCUMENTS

| | | | | |
|---|---|---|---|---|
| 4,040,990 A * | 8/1977 | Neely | B01J 20/22 521/142 |
| 5,840,293 A | 11/1998 | Nacht et al. | |

(Continued)

OTHER PUBLICATIONS

International Preliminary Report on Patentability for Corresponding Application No. PCT/US2021/013262 (Jul. 19, 2022).

(Continued)

*Primary Examiner* — John J Figueroa

(74) *Attorney, Agent, or Firm* — Troutman Pepper Locke LLP (Rochester)

(57) ABSTRACT

The present application relates to a polymerizable composition comprising: (a) a first monomer of Formula (I): (I) wherein R as described herein and (b) a second monomer of Formula (II): (II) The present application also relates to one or more adsorbent beads produced by polymerizing the polymerizable composition and to a method for heparin recovery using the adsorbent beads.

(I)

(Continued)

-continued (II)

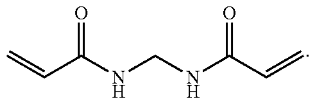

17 Claims, 13 Drawing Sheets

(51) Int. Cl.
*B01J 20/28* (2006.01)
*B01J 20/30* (2006.01)
*C08B 37/00* (2006.01)

(52) U.S. Cl.
CPC ... *B01J 20/28059* (2013.01); *B01J 20/28076* (2013.01); *B01J 20/28088* (2013.01); *B01J 20/30* (2013.01); *C08B 37/0003* (2013.01); *C08B 37/0075* (2013.01)

(56) References Cited

U.S. PATENT DOCUMENTS

| | | | |
|---|---|---|---|
| 5,900,146 A | 5/1999 | Ballard et al. | |
| 9,662,647 B2 | 5/2017 | Yin et al. | |
| 2003/0199633 A1 | 10/2003 | Leon et al. | |
| 2013/0317129 A1* | 11/2013 | Koguma | B01J 20/3278 521/38 |
| 2021/0170362 A1* | 6/2021 | Tokimizu | B01J 20/261 |

OTHER PUBLICATIONS

Eskandarloo et al., "High-Throughput, Green, Low-Cost, and Efficient Recovery of Heparin from a Biological Mixture Using Bio-Originated Magnetic Nanofibers," ACS Sustainable Chem. Eng. 7:3895-3908 (2019).

Enayati et al., "Synthesis of Cross-Linked Spherical Polycationic Adsorbents for Enhanced Heparin Recovery," ACS Biomater. Sci. Eng. 6:2822-2831 (2020).

International Search Report and Written Opinion for Corresponding Application No. PCT/US2021/013262 (mailed Apr. 22, 2021).

Enayati et al., "One-Pot Synthesis of Cross-Linked Polymer Networks as a Hydrophilic Super-Adsorbent for Efficient Recovery of Heparin," ACS Appl. Polym. Mater. 1:230-238 (2019).

* cited by examiner

X= H or $SO_3H$; Y= $COCH_3$ or $SO_3H$

Major repeating unit Minor repeating unit

FIGURES 2A-C

FIGURES 7A1-A3, B1-B3, C1-C3, D1-D3, E1-E3, and F1-F3

FIGURES 8A1-A2, B1-B2, C1-C2, and D1-D2

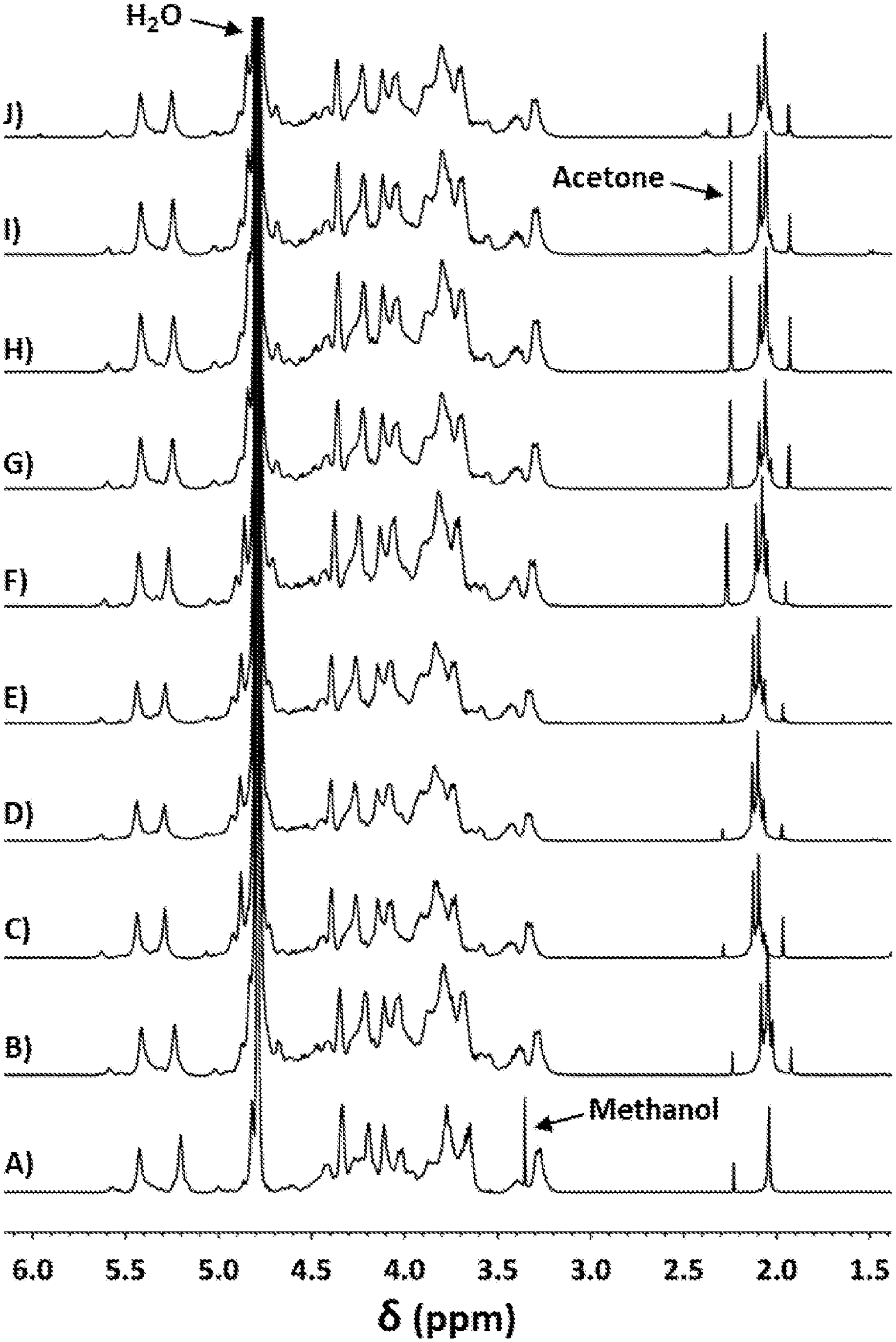
FIGURES 10A-J

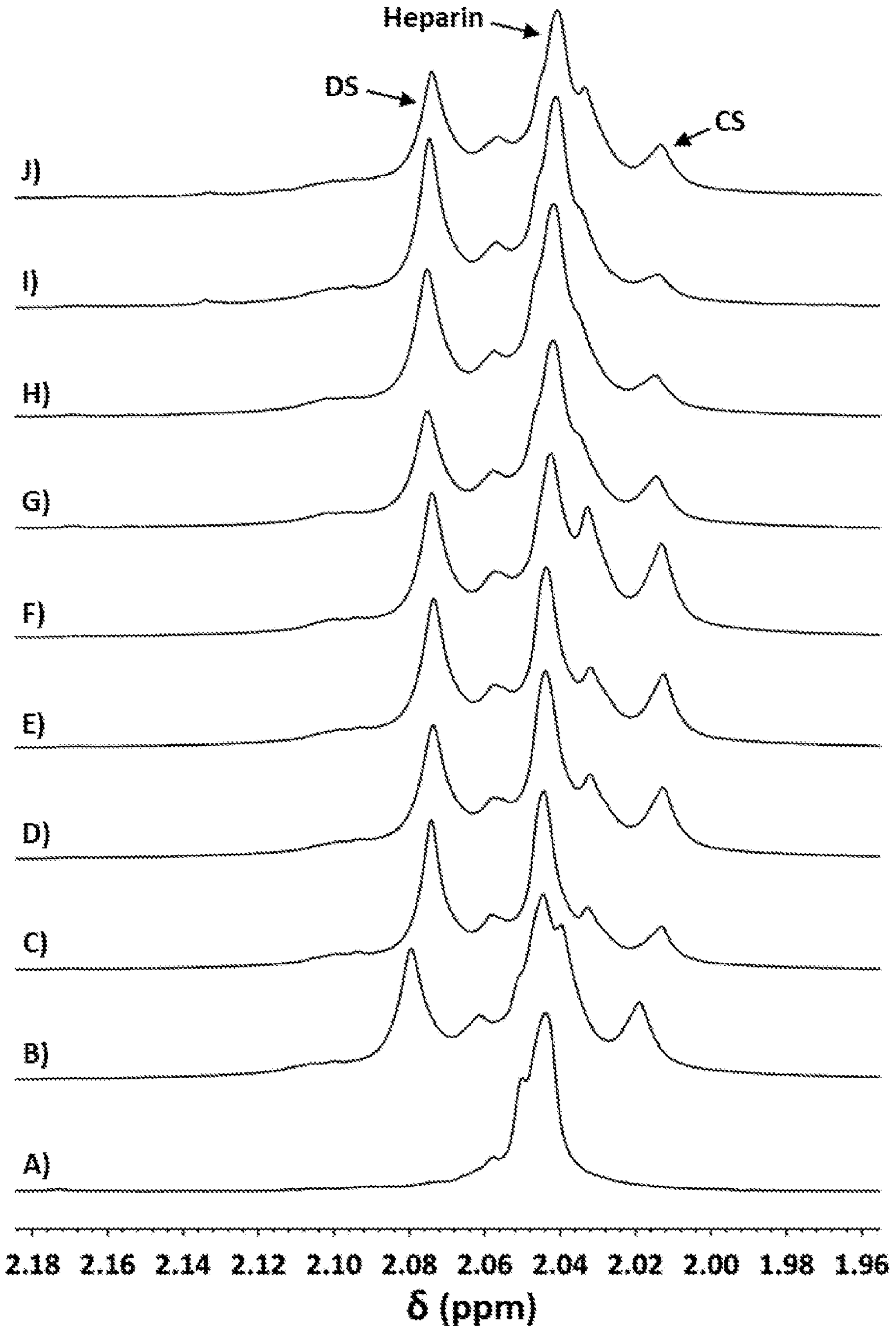
FIGURES 11A-J

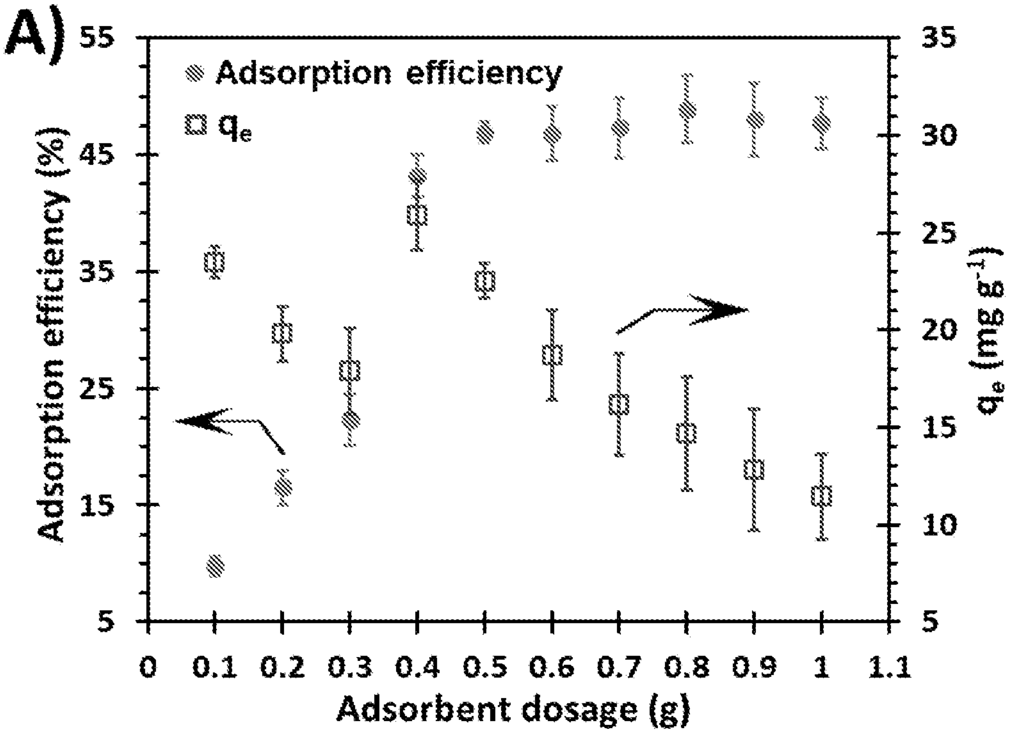
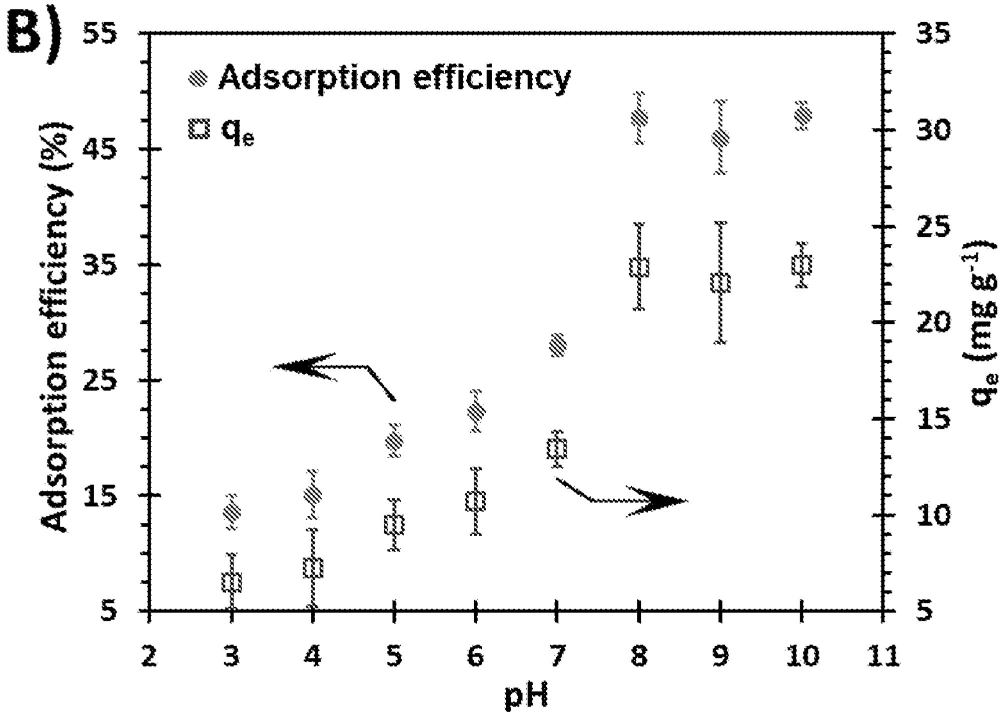
FIGURES 12A-B

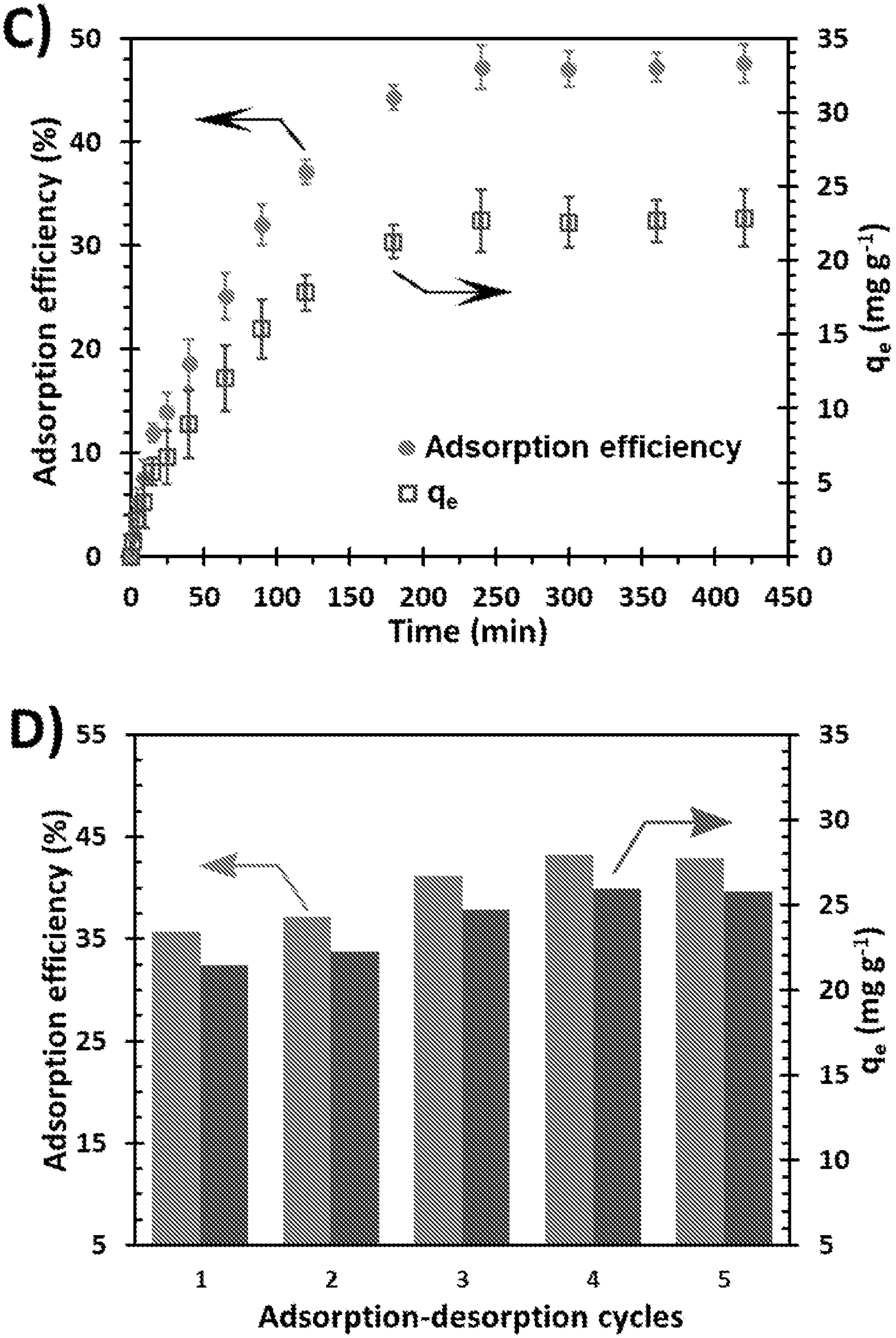
FIGURES 12C-D

SYNTHESIS OF CROSS-LINKED SPHERICAL POLYCATIONIC BEAD ADSORBENTS FOR HEPARIN RECOVERY

This application is a national stage application under 35 U.S.C. § 371 of International Application No. PCT/US2021/013262, filed Jan. 13, 2021, which claims the priority benefit of U.S. Provisional Patent Application Ser. No. 62/960,513, filed Jan. 13, 2020, which is are hereby incorporated by reference in their entirety.

FIELD

The present application relates to the synthesis of cross-linked spherical polycationic bead adsorbents for heparin recovery.

BACKGROUND

Heparin is a common blood thinning agent and is primarily recovered from the complex biological mixture of porcine intestinal mucosa (van der Meer et al., "From Farm to Pharma: an Overview of Industrial Heparin Manufacturing Methods," *Molecules* 22(6):1025 (2017)). As a sulfated glycosaminoglycan (GAG), heparin possesses a high density of negative charges per repeating unit (Rubinson et al., "Heparin's Solution Structure Determined by Small-Angle Neutron Scattering," *Biopolymers* 105(12):905-913 (2016)) (FIG. 1). This negative charge of heparin is often utilized in its recovery (U.S. Pat. No. 6,232,093 to Van Houdenhoven et al.; Men et al., "Preparation of Cationic Functional Polymer Poly (Acryloxyethyltrimethyl Ammonium Chloride)/$SiO_2$ and its Adsorption Characteristics for Heparin," *Korean J. Chem. Eng.* 34(7):1889-1895 (2017); Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24):5491-5508 (2018)), a process that typically involves digesting the biological mixture at 55° C. using subtilisin alkaline protease enzyme and then capturing the freed heparin using an anion exchange adsorbent (van der Meer et al., "From Farm to Pharma: an Overview of Industrial Heparin Manufacturing Methods," *Molecules* 22(6):1025 (2017); Cesaretti et al., "Isolation and Characterization of a Heparin with High Anticoagulant Activity from the Clam Tapes Phylippinarum: Evidence for the Presence of a High Content of Antithrombin III Binding Site," *Glycobiology* 14(12):1275-1284 (2004)). The raw heparin adsorbed is then eluted and isolated for further purification. Since heparin is almost solely obtained from animal tissues, it is critical to design an adsorbent with maximum efficiency. Although, there are many functionalized nano and micron-size adsorbents developed for the recovery of heparin (Men et al., "Preparation of Cationic Functional Polymer Poly (Acryloxyethyltrimethyl Ammonium Chloride)/$SiO_2$ and its Adsorption Characteristics for Heparin," *Korean J. Chem. Eng.* 34(7):1889-1895 (2017); Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24):5491-5508 (2018); Eskandarloo et al., "Highly Efficient Recovery of Heparin Using a Green and Low-Cost Quaternary Ammonium Functionalized Halloysite Nanotube," *ACS. Sustain. Chem. Eng.* 6(11):15349-15360 (2018); Eskandarloo et al., "Selective Electrochemical Capture and Release of Heparin Based on Amine Functionalized Carbon/Titanium Dioxide Nanotube Arrays," *ACS Applied Bio Materials* 2(6):2685-2697 (2019)), the separation of these small sized adsorbents from the digested mixture of mucosa is a challenge for industrial application (van der Meer et al., "From Farm to Pharma: an Overview of Industrial Heparin Manufacturing Methods," *Molecules* 22(6):1025 (2017)). However, spherical bead resins with larger diameters of ~0.3-2.0 mm are very popular for industrial capture of value-added products since they can be easily sieved after batch adsorptions or packed into columns for continuous processes (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Eskandarloo et al., "Multi-Porous Quaternized Chitosan/Polystyrene Microbeads for Scalable, Efficient Heparin Recovery," *Chem. Eng. J.* 348:399-408 (2018); Varghese et al., "Efficiency of Polymer Beads in the Removal of Heparin: Toward the Development of a Novel Reactor," *Artif. Cells Blood Substit. Immobil. Biotechnol.* 34(4), 419-432 (2006); Wang et al., "Design of Carboxymethyl Chitosan-Based Heparin-Mimicking Cross-Linked Beads for Safe and Efficient Blood Purification," *Int. J. Biol. Macromol.* 117:392-400 (2018)).

Heparin has considerably higher negative charges per disaccharide unit compared to other GAGs (van der Meer et al., "From Farm to Pharma: an Overview of Industrial Heparin Manufacturing Methods," *Molecules* 22(6):1025 (2017); Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019)). Therefore, almost all commercially available resins for heparin adsorption (e.g., Amberlites (WO 2010/110654 to Vreeburg et al.), Dowex (Flengsrud et al., "Purification, Characterization and in vivo Studies of Salmon Heparin," *Thromb. Res.* 126(6):e409-e417 (2010)), Lewatit (Linhardt et al., "Isolation and Characterization of Human Heparin," *Biochemistry* (*Mosc.*) 31(49):12441-12445 (1992)), and DEAE (Hoke et al., "A Heparin Binding Synthetic Peptide From Human HIP/RPL29 Fails to Specifically Differentiate Between Anticoagulantly Active and Inactive Species of Heparin," *J. Negat. Results Biomed.* 2(1):1 (2003)) are essentially anion exchange resins that contain quaternary ammonium groups as the major functional adsorbent (van der Meer et al., "From Farm to Pharma: an Overview of Industrial Heparin Manufacturing Methods," *Molecules* 22(6):1025 (2017)). However, functionality alone is not enough for designing of an efficient adsorbent. Porosity, hydrophilicity/hydrophobicity control (through an appropriate choice of comonomers), and degree of cross-linking, also need to be controlled and tuned for specific applications. Porosity plays a critical role as it determines the available surface area of the resin and therefore its adsorption capacity. Almost all of commercially available resins that have been used for heparin adsorption are macroporous (macroreticular) cross-linked polymer beads (Svec et al., "New Designs of Macroporous Polymers and Supports: From Separation to Biocatalysis," *Science* 273(5272):205-211 (1996); Kunin et al., "Macroreticular Ion Exchange Resins," *J. Am. Chem. Soc.* 84(2):305-306. (1962); Kun et al., "Pore Structure of Some Macroreticular Ion Exchange Resins," *Journal of Polymer Science Part B: Polymer Letters* 2(6):587-591 (1964)), containing pores larger than 50 nm which provides a large surface area. Another requirement for heparin adsorbents is that they should be non-toxic and benign in order to prevent contamination of the recovered heparin, since it is used as an active pharmaceutical ingredient (Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24):5491-5508 (2018); Beni et al., "Analysis and Characterization of Heparin Impurities," *Anal. Bioanal. Chem.* 399(2):527-539 (2011)). Considering the extremely low concentration of heparin in biological samples (~0.01 wt %), and the fact that digested mucosa contains several competitive species, including proteins, nucleic acids, and other GAGs (specially chondroitin sulfate and dermatan sulfate), it is critical to engineer the design and synthesis of the resin in terms of its chemical structure, functionality, and morphology. The resin should be highly effective at the adsorption of heparin in high quantity while interacting with structurally similar GAGs to a lesser degree within the complex mixture of the digested mucosa.

The present application is directed to overcoming these and other deficiencies in the art.

SUMMARY

One aspect of the present application relates to a polymerizable composition. The polymerizable composition comprises:

(a) a first monomer of Formula (I):

(I)

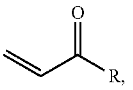

wherein

R is selected from the group consisting of $NH_2$, $NHR^1$, $NR^1R^2$, —NH-A-$NR^1R^2$,

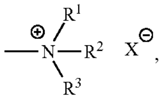, and 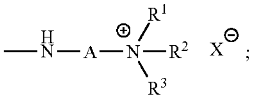;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen; and (b) a second monomer of Formula (II):

(II)

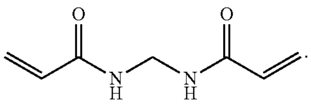

Another aspect of the present application relates to a process for the production of one or more adsorbent beads. This method includes:

providing a first monomer of Formula (I):

(I)

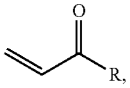

wherein

R is selected from the group consisting of $NH_2$, $NHR^1$, $NR^1R^2$, —NH-A-$NR^1R^2$,

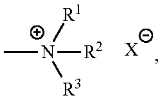, and 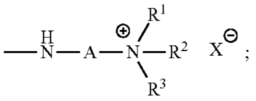;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen;

providing a second monomer of Formula (II):

(II)

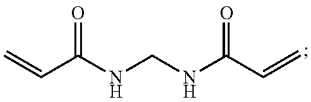

and polymerizing the first monomer of Formula (I) and the second monomer of Formula (II) under conditions effective to produce one or more adsorbent beads.

Another aspect of the present application relates to a polymerizable composition. The polymerizable composition comprises:

(a) a first monomer of Formula (I):

(II)

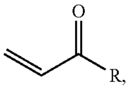

wherein

R is selected from the group consisting of $NH_2$, $NHR^1$, $NR^1R^2$, —NH-A-$NR^1R^2$,

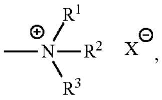, and 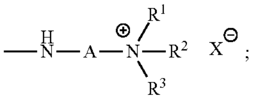;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen;

(b) a second monomer of Formula (II):

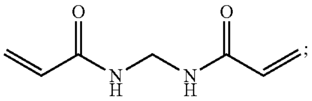

and (c) a third monomer of Formula (III):

(III)

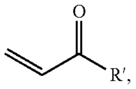

wherein

R' is selected from the group consisting of $NH_2$, $NHR^{1}{}'$, $NR^{1}{}'R^{2}{}'$, —NH-A-$NR^{1}{}'R^{2}{}'$,

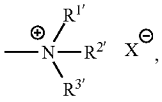 and 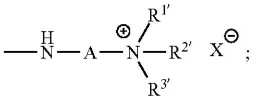

$R^{1}{}'$ is H or $C_{1-6}$ alkyl;

$R^{2}{}'$ is H or $C_{1-6}$ alkyl;

$R^{3}{}'$ is H or $C_{1-6}$ alkyl;

A is $C_{1-6}$ alkylene which can be optionally substituted with $C_{1-6}$ alkyl; and X is halogen, wherein the third monomer of Formula (III) is different from the first monomer of Formula (I).

Another aspect of the present application relates to a process for the production of one or more modified adsorbent beads. This process includes:

providing a first monomer of Formula (I):

(I)

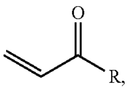

wherein

R is selected from the group consisting of $NH_2$, $NHR^1$, $NR^1R^2$, —NH-A-$NR^1R^2$,

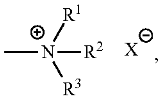 and 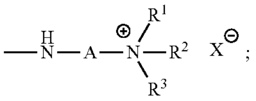

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl;

X is halogen;

providing a second monomer of Formula (II):

(II)

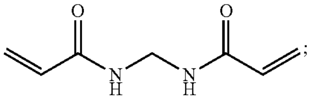

providing a third monomer of Formula (III):

(III)

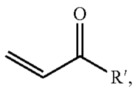

wherein

R' is selected from the group consisting of $NH_2$, $NHR^{1}{}'$, $NR^{1}{}'R^{2}{}'$, —NH-A-$NR^{1}{}'R^{2}{}'$,

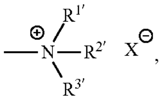 and 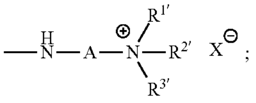

$R^{1}{}'$ is H or $C_{1-6}$ alkyl;

$R^{2}{}'$ is H or $C_{1-6}$ alkyl;

$R^{3}{}'$ is H or $C_{1-6}$ alkyl;

A is $C_{1-6}$ alkylene which can be optionally substituted with $C_{1-6}$ alkyl;

X is halogen, wherein the third monomer of Formula (III) is different from the first monomer of Formula (I); and polymerizing the first monomer of Formula (I), the second monomer of Formula (II), and the third monomer of Formula (III) to produce one or more modified adsorbent beads.

Another aspect of the present application relates to one or more adsorbent beads comprising a polymerized first monomer of Formula (I)

(I)

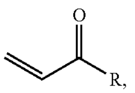

wherein

R is selected from the group consisting of $NH_2$, $NHR^1$, $NR^1R^2$, —NH-A-$NR^1R^2$,

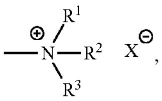 and 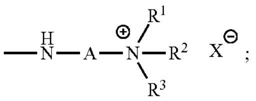

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen.

Heparin as an anticoagulant drug almost entirely produced via isolation from mucosal tissue of different animals, therefore, it is crucial to maximize its recovery. Adsorption of heparin from this complex biological mixture needs a specialized and highly effective adsorbent that almost separate only heparin from the mixture. In this application, a series of spherical cross-linked polymer-bead adsorbents were synthesized via inverse suspension polymerization of water-soluble monomers in corn oil as benign solvent and their performance for heparin adsorption from a biological sample of porcine mucosa was evaluated. To tune the performance and swelling of the resins, the mole ratio of the monomer(s) to cross-linker as well as the mole ratio of the monomers were varied. Results of heparin recovery from biological porcine mucosa showed that the optimized resin can outperform the commercially available resin in terms of adsorption efficiency up to 18%. The adsorbed heparin was eluted, isolated and its anticoagulant potency was measured using the standard sheep plasma clotting assay. The isolated heparin samples were also analyzed by the $^{1}$H-NMR to check the possible impurities and results showed the presence of chondroitin sulfate and dermatan sulfate as it is the case for the heparin eluted from the commercial resin. Furthermore, the effects of some experimental variables including adsorbent dosage, pH, time, and recycling on the heparin adsorption was studied and results show that these resins can be used for efficient recovery of heparin.

In the present application, the inverse suspension polymerization of the cationic monomer, (3-acrylamidopropyl) trimethylammonium chloride (APTMAC), initiated by ammonium persulfate (APS) and cross-linked using water soluble N,N'-methylenebisacrylamide (BisAAm) in corn oil was used to prepare functional polymer beads as heparin adsorbent. Additionally, the effect of adding acrylamide (AAm) as a neutral monomer in the polymerization was studied in order to tune the hydrophilicity, swelling, and efficiency of the adsorbent. The interpenetrating polymer network (IPN) resins was also synthesized, by first producing a porous cross-linked polyacrylamide bead and then, in the second step, by polymerizing the APTMAC inside the pore of the polyacrylamide (PAAm) core (Dragan, E. S. "Design and Applications of Interpenetrating Polymer Network Hydrogels. A Review," *Chem. Eng. J.* 243:572-590 (2014), which is hereby incorporated by reference in its entirety). Additionally, polyvinyl alcohol (PVOH) was used as porogen to produce proper porosity while dioctyl sulfosuccinate sodium salt (AOT) was used in some formulations as an anionic surfactant. This surfactant ensures the insertion of the APTMAC monomers mostly at the water-oil interface, i.e. the surface of the spherical adsorbent. Cooking grade corn oil was used as a green solvent for all of the inverse suspension polymerization both for its benign and non-toxic nature and its appropriate viscosity for providing stable droplets. Cross-linked porous polymer beads with diameters ranging from 0.3 to 1.0 mm were obtained after 3 hours of polymerization. The morphology and chemical structure of the resins were characterized, revealing their porosity and quaternary ammonium functionality. Additionally, the efficiency for heparin recovery from a biological mucosa sample was evaluated by a standard sheep plasma clotting assay of the heparin eluted from the resins. Furthermore, the effect of the resin dosage, pH, adsorption time, and recycling on the heparin adsorption efficiency were investigated. The results of the present application show that the synthesized resin can outperform the commercially available resin in terms of adsorption efficiency.

BRIEF DESCRIPTION OF THE DRAWINGS

FIGS. 7A1-A3, B1-B3, C1-C3, D1-D3, E1-E3, and F1-F3 are SEM micrographs of some of the samples at different magnification. FIGS. 7A1-A3 are SEM micrographs of the APTMAC-AAm copolymer synthesized without surfactant (R1); FIGS. 7B1-B3 are SEM micrographs of the APTMAC homopolymer synthesized using the AOT surfactant (R4); FIGS. 7C1-C3 are SEM micrographs of the X-AAm resins used as the core for the synthesis of the IPN resins; FIGS. 7D1-D3 are SEM micrographs of the IPN resin (R6); FIGS. 7E1-E3 are SEM micrographs of the APTMAC-AAm copolymer (75:25) synthesized with the AOT surfactant (R9); and FIGS. 7F1-F3 are SEM micrographs of resin R9 after heparin adsorption from the biological intestinal mucosa. See Table 1 for reaction conditions and heparin adsorption results.

FIGS. 8A1-A2, B1-B2, C1-C2, and D1-D2 are SEM micrographs of some of the samples at different magnification. FIGS. 8A1-A2 are SEM micrographs of the APTMAC homopolymer synthesized with highest degree of cross-linking and no surfactant (R2); FIGS. 8B1-B2 are SEM micrographs of the IPN resin (R5); FIGS. 8C1-C2 are SEM micrographs of the APTMAC-AAm copolymer (75:25) synthesized with the AOT surfactant (R7); and FIGS. 8D1-D2 are SEM micrographs of the APTMAC-AAm copolymer (90:10) synthesized with the AOT surfactant (R8). See Table 1 for reaction conditions and heparin adsorption results.

FIGS. 10A-J show 500 MHz $^{1}$H-NMR spectra of the pharmaceutical grade heparin (FIG. 10A), heparin eluted from commercial Amberlite FPA98 Cl resin (FIG. 10B), and heparin eluted from resins R1, R2, and R4 to R9 resins (FIGS. 10C-J).

FIGS. 11A-J show expansion of the $^{1}$H-NMR spectra of the pharmaceutical grade heparin (FIG. 11A), heparin eluted from commercial Amberlite FPA98 Cl resin (FIG. 11B); and heparin eluted from resins R1, R2, and R4 to R9 resins in the range of 1.96 to 2.18 ppm (related to the N-acetyl methyl region) (FIGS. 11C-J).

FIGS. 12A-D are graphs showing the adsorption efficiency (%) and adsorption capacity ($q_e$, mg $g^{-1}$) of heparin adsorbed on the R9 resin beads with respect to the adsorbent dosage (FIG. 12A), pH (FIG. 12B), adsorption time (FIG. 12C), and the consecutive adsorption-desorption cycles of resin R9 (FIG. 12D).

DETAILED DESCRIPTION

Figure 1:
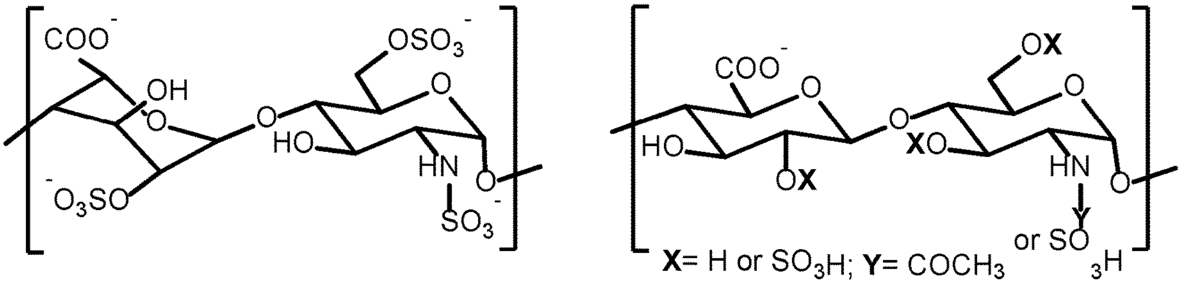
FIG. 1 is a scheme showing the structure of heparin, which is a sulfated GAG with a high density of negative charges (Rubinson et al., "Heparin's Solution Structure Determined by Small-Angle Neutron Scattering," *Biopolymers* 105(12):905-913 (2016), which is hereby incorporated by reference in its entirety).

One aspect of the present application relates to a polymerizable composition. The polymerizable composition comprises:

(a) a first monomer of Formula (I):

(I)

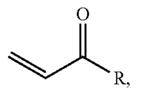

wherein

R is selected from the group consisting of $NH_2$, $NHR^1$, $NR^1R^2$, —NH-A-$NR^1R^2$,

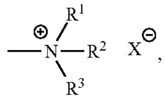
, and
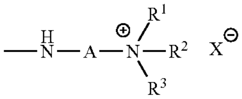
;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen; and (b) a second monomer of Formula (II):

(II)

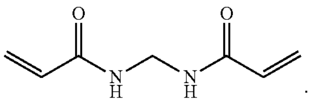

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term “alkyl” means an aliphatic hydrocarbon group which may be straight or branched having about 1 to about 12 carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term “alkylene” refers to a group obtained by removal of a hydrogen atom from an alkyl group. Non-limiting examples of alkylene include methylene and ethylene.

The term “halogen” means fluoro, chloro, bromo, or iodo.

Suitable monomers that can be used as the first monomer of Formula (I) according to the present application are acrylamide (AAm), (3-acrylamidopropyl)trimethylammonium chloride (APTMAC), methacrylamide (MAAm), and N-tert-butylacrylamide. In one embodiment, the first monomer of Formula (I) is acrylamide (AAm).

Suitable monomers that can be used as the second monomer of Formula (II) according to the present application are N,N'-methylenebisacrylamide (BisAAm) and ethyleneglycol dimethacrylate (EGDMA). In one embodiment, the second monomer of Formula (II) is N,N'-methylenebisacrylamide (BisAAm).

The polymerizable compositions can contain different amounts of the first monomer of Formula (I). For example, the first monomer of Formula (I) can be present in the polymerizable composition in an amount of from 1 to 99% by weight, from 2 to 90% by weight, from 3 to 85% by weight, from 4 to 80% by weight, from 5 to 75% by weight, from 6 to 70% by weight, from 7 to 65% by weight, from 8 to 60% by weight, from 9 to 60% by weight, from 10 to 60% by weight, from 15 to 60% by weight, from 20 to 60% by weight, from 25 to 60% by weight, from 30 to 60% by weight, or from 35 to 55% by weight. Alternatively, the first monomer of Formula (I) can be present in the polymerizable composition in an amount of from 3 to 90% by weight, from 4 to 90% by weight, from 5 to 90% by weight, from 5 to 85% by weight, from 5 to 80% by weight, from 5 to 75% by weight, from 5 to 70% by weight, from 5 to 65% by weight, from 5 to 60% by weight, from 5 to 55% by weight, from 5 to 50% by weight, from 5 to 45% by weight, from 5 to 40% by weight, from 5 to 35% by weight, from 5 to 30% by weight, from 5 to 25% by weight, from 5 to 20% by weight, or from 5 to 15% by weight.

The polymerizable compositions can contain different amounts of the second monomer of Formula (II). For example, the second monomer of Formula (II) can be present in the polymerizable composition in an amount of from 1 to 99% by weight, from 2 to 90% by weight, from 3 to 85% by weight, from 4 to 80% by weight, from 5 to 75% by weight, from 6 to 70% by weight, from 7 to 65% by weight, from 8 to 60% by weight, from 9 to 60% by weight, from 10 to 60% by weight, from 15 to 60% by weight, from 20 to 60% by weight, from 25 to 60% by weight, from 30 to 60% by weight, or from 35 to 55% by weight. Alternatively, the second monomer of Formula (II) can be present in the polymerizable composition in an amount of from 3 to 90% by weight, from 4 to 90% by weight, from 5 to 90% by weight, from 5 to 85% by weight, from 5 to 80% by weight, from 5 to 75% by weight, from 5 to 70% by weight, from 5 to 65% by weight, from 5 to 60% by weight, from 5 to 55% by weight, from 5 to 50% by weight, from 5 to 45% by weight, from 5 to 40% by weight, from 5 to 35% by weight, from 5 to 30% by weight, from 5 to 25% by weight, from 5 to 20% by weight, or from 5 to 15% by weight.

The polymerizable compositions can contain different amounts of the third monomer of Formula (III). For example, the third monomer of Formula (III) can be present in the polymerizable composition in an amount of from 1 to 99% by weight, from 2 to 90% by weight, from 3 to 85% by weight, from 4 to 80% by weight, from 5 to 75% by weight, from 6 to 70% by weight, from 7 to 65% by weight, from 8 to 60% by weight, from 9 to 60% by weight, from 10 to 60% by weight, from 15 to 60% by weight, from 20 to 60% by weight, from 25 to 60% by weight, from 30 to 60% by weight, or from 35 to 55% by weight. Alternatively, the third monomer of Formula (III) can be present in the polymerizable composition in an amount of from 3 to 90% by weight, from 4 to 90% by weight, from 5 to 90% by weight, from 5 to 85% by weight, from 5 to 80% by weight, from 5 to 75% by weight, from 5 to 70% by weight, from 5 to 65% by weight, from 5 to 60% by weight, from 5 to 55% by weight, from 5 to 50% by weight, from 5 to 45% by weight, from 5 to 40% by weight, from 5 to 35% by weight, from 5 to 30% by weight, from 5 to 25% by weight, from 5 to 20% by weight, or from 5 to 15% by weight.

In one embodiment, a one or more adsorbent beads are produced by polymerizing the polymerizable composition of the present application.

The polymerization step according to the present application can be carried out using a variety of techniques. For example, inverse suspension polymerization, suspension polymerization, emulsion polymerization, inverse emulsion polymerization, dispersion polymerization, and aqueous dispersion polymerization. In one embodiment, the polymerization is carried out using inverse suspension polymerization.

Suspension polymerization is a method of choice for manufacturing spherical bead resins with large diameters as it has been used widely for the synthesis of polystyrene and polyacrylate beads (Dowding et al., "Suspension Polymerisation to Form Polymer Beads," *Colloids Surf Physicochem. Eng. Aspects* 161(2):259-269 (2000); Enayati et al., "Cu (0)-Mediated Reversible-Deactivation Radical Polymerization of n-Butyl Acrylate in Suspension," *Polymer* 153:464-473 (2018). However, for highly hydrophilic monomers, such as acrylamide (AAm), inverse suspension polymerization should be used in which the aqueous phase containing the monomer(s) and initiator is dispersed inside the continuous organic phase followed by typical free radical polymerization.

The suspension polymerization system consists of a dispersing medium, monomer(s), stabilizing agents, and a monomer soluble initiator. Water is almost in all cases the continuous phase. The polymerization is carried out in the small droplets of liquid monomer. During the polymerization, the immiscible droplets slowly convert from a liquid to a sticky, viscous material and, when reaching a sufficient high molecular weight, form solid, rigid particles. In carrying out this procedure, the volume ratio of the two phases, stirring speed, temperature, and phase viscosities should be controlled in order to generate stable monomer droplets inside the continuous phase. The droplets should be stable during the course of the polymerization otherwise coalescence of the monomer phase will occur (Alroaithi et al., "Suppressing Coalescence and Improving Uniformity of Polymer Beads in Suspension Polymerization Using a Two-Stage Stirring Protocol," *Industrial & Engineering Chemistry Research* 57(35):11883-11892 (2018)), resulting in uncontrolled bulk-wise polymerization (Enayati et al., "Cu (0)-Mediated Reversible-Deactivation Radical Polymerization of n-Butyl Acrylate in Suspension," *Polymer* 153:464-473 (2018)).

Inverse suspension polymerization consists of polymerizing an aqueous phase of water-soluble monomers dispersed in a droplet form in a hydrophobic phase in the presence of at least one suspension stabilizer and/or stabilizing surfactant. The monomers present in the droplets polymerize owing to initiators to obtain "set" droplets made up primarily of water and polymer. One or several water and solvent extraction steps make it possible to isolate the polymer in a bead form.

Emulsion polymerization is the polymerization of monomers in the form of emulsions. In this technique, a small amount of water-insoluble monomer is dispersed in water phase, and water-soluble initiators are added into the solution. An appropriate surfactant that shows hydrophobic and hydrophilic feature is used for the stabilization of the emulsion of the monomer in the aqueous phase. Surfactant molecules come together and form aggregates also called "micelles." Then, free radical initiator molecules in the aqueous phase migrate into the micelles, and polymerization is initiated. The polymerization kinetics consists of three stages. In the first stage, monomers diffuse from droplet into micelles and polymerization starts to form polymeric particles. Second stage corresponds to growth of polymeric particles by propagation. During this stage, the monomer concentration inside the polymeric particles and number of polymeric particles remain almost constant. In the final stage, the rate of the polymerization decreases, and no monomer droplets are observed. The remaining monomers in the particles are polymerized.

In an inverse emulsion polymerization, a hydrophilic monomer, frequently in aqueous solution, is emulsified in a continuous oil phase using a water-in-oil emulsifier and polymerized using either an oil-soluble or water-soluble initiator; the products are viscous lattices comprised of submicroscopic, water-swollen, hydrophilic polymer particles colloidally suspended in the continuous oil phase. The average particle sizes of these lattices are as small as 0.05 microns. The technique is applicable to a wide variety of hydrophilic monomers and oil media.

Dispersion polymerization is a type of heterogeneous polymerization and, unlike emulsion polymerization, the monomer is soluble in the continuous phase but the resulting polymer is not. The continuous phase usually consists of water and alcohol (such as methanol or ethanol). Upon initiation, the polymerization starts in the continuous phase and the oligomers formed are precipitated and aggregated to form particles which are often stabilized by a non-ionic surfactant such a polyvinyl pyrrolidone. Due to the short nucleation, monodispersed particles in the size range 1-5 μm are formed. Particle size is controlled by several parameters such as the type and concentration of the surfactant, the solids content, the initiator concentration and the solvent used.

In one embodiment, the polymerizable composition comprises the monomers (a first monomer of Formula (I) and a second monomer of Formula (II)) dissolved in water. In another embodiment, the polymerizable composition comprises the monomers (a first monomer of Formula (I), a second monomer of Formula (II), and a third monomer of Formula (III)) dissolved in water. In some embodiments, an organic solvent, such as MeOH, EtOH, and i-propanol (i-PrOH), can be added to help with the dissolution of the monomers. The concentration of the monomers in the aqueous solution in which the monomer is dissolved is preferably in the range from 20% to 80% by weight, and particularly from 30% to 60%.

In one embodiment, the polymerizable compositions further includes a porogen.

In another embodiment, the polymerizable compositions further includes a surfactant.

The polymerizable composition is stirred at room temperature or elevated temperatures to obtain a transparent solution. The mixture can be stirred for at least 5 minutes, at least 10 minutes, at least 15 minutes, at least 20 minutes, at least 25 minutes, or at least 30 min. Next, the mixture is defoamed by sonication. The initiator is then added and carefully dissolved in the solution. Preferably, initiator is dissolved by gentle mixing to avoid foam formation.

The aqueous solution is than quickly added to a reactor containing an organic phase. Suitable organic phases include hydrophobic solvents, such as corn oil, and other food safe vegetable oil such as olive oil as well as other benign hydrophobic solvents such as paraffin oil, silicon oil, and limonene. The mixture is stirred at about 40° C., about 50° C., about 60° C., about 70° C., about 80° C., or about 90° C. for at least 1 hour, at least 2 hours, at least 3 hours, or at least 4 hours. During the polymerization, the polymers are formed which are shaped in the form of a bead. After the reaction is complete, the majority of the organic phase is removed. Suitable ways to remove the solvent include decantation, filtration, or centrifugation. Remaining reaction mixture is poured into a suitable organic solvent (such as hexanes and/or ethanol) and stirred at a temperature of about 40° C., about 50° C., about 60° C., about 70° C., or about 80° C. for at least 20 minutes, at least 25 minutes, or at least 30 min. The mixture is then filtered and the beads are washed with aqueous base solutions (such as aqueous NaOH), and/or saturated salt solutions (such as saturated NaCl solution or saturated KCl solution), and finally with water. The resulting adsorbent beads, if desired, can be dried using any suitable method.

In some embodiments, the resulting adsorbent beads can be fractionated using techniques such as sieving, screening, sedimentation, and air classification.

The presence of a porogen permits control of the resin surface area of the bead, the pore-size, the pore-size distribution (PSD), the pore-volume, and the morphology of the bead.

Suitable porogens that can be used in accordance with the present application include, but are not limited to polyvinyl alcohol, polyethylene glycol (PEG), and some natural polymers, including, but not limited to, maltodextrin, carboxymethyl cellulose, methyl cellulose, and hydroxypropyl methyl cellulose. In one embodiment, the porogen is polyvinyl alcohol.

If a porogen is used in the preparation of the adsorbent beads, the adsorbent beads can then be subjected to a series of washing steps to remove the porogen. Suitable solvents for removing the porogen include polar solvents such as, for example, water, acetone, alcohols (e.g., methanol, ethanol, n-propanol, and i-propanol), dimethylsulfoxide, dimethylformamide, N-methylpyrrolidone, acetonitrile, and the like. The resulting adsorbent beads, if desired, can be dried using any suitable method.

The presence of a porogen allows to control the resin surface area of the bead, pore-size, pore-size distribution (PSD), and morphology of the composition or a polymer. Higher amounts of the porogen can provide higher porosity of the adsorbent beads, leading to higher surface area which, in combination with proper functionality of the surface, can lead to higher adsorption efficiency of the adsorbent beads according to the present application.

The concentration of the functional group on the adsorbent beads increases with a decrease in the degree of cross-linking for the same composition of the monomers.

The surfactant may be included to facilitate the formation or the maintenance of the suspension during the polymerization. Suitable surfactants that can be used in accordance with the present application include, but are not limited to anionic surfactants and non-ionic surfactants.

Suitable anionic surfactants that can be used in accordance with the present invention include alkylbenzene sulfonates, alkyl sulfonates, alkyl sulfates, salts of fluorinated fatty acids, silicones, fatty alcohol sulfates, polyoxyethylene fatty alcohol ether sulfates, α-olefin sulfonate, polyoxyethylene fatty alcohol phosphates ether, alkyl alcohol amide, alkyl sulfonic acid acetamide, alkyl succinate sulfonate salts, amino alcohol alkylbenzene sulfonates, naphthenates, alkylphenol sulfonate, and polyoxyethylene monolaurate. In one embodiment, the surfactant is dioctyl sulfosuccinate sodium salt (AOT).

Suitable non-ionic surfactants that can be used in accordance with the present invention include ethoxylated and alkoxylated fatty acids, ethoxylated amines, ethoxylated alcohol, alkyl and nonyl-phenol ethoxylates, ethoxylated sorbitan esters, and castor oil ethoxylate.

The addition of the surfactant during polymerization process can affect the hydrophilic character of the adsorbent beads. Using the anionic surfactant during the polymerization process ensures that more of the cationic monomer, which is more hydrophilic, is located on the surface of the resin. Therefore, the resin becomes more hydrophilic and also more functional.

The addition of the surfactant during polymerization process also affect the roughness of the adsorbent bead's surface. The rougher the bead's surface, the higher the surface area and the more heparin is adsorbed by the adsorbent bead.

The initiator is added to initiate the polymerization of the monomers present in the droplets. Suitable initiators that can be used in accordance with the present application include, but are not limited to ammonium persulfate (APS), potassium persulfate, and 2,2'-Azobis(2-ethylpropionamidine)dihydrochloride (AEPDHC). In one embodiment, the initiator is ammonium persulfate (APS).

The initiator can be present in the polymerizable composition in an amount of from the 0 to 20% by weight. For example, the initiator can be present in the polymerizable composition in an amount of from 0.001 to 19% by weight, from 0.005 to 15% by weight, from 0.005 to 10% by weight, from 0.01 to 10% by weight, from 0.01 to 9% by weight, from 0.01 to 8% by weight, from 0.01 to 7% by weight, from 0.01 to 6% by weight, from 0.01 to 5% by weight, from 0.01 to 4% by weight, from 0.01 to 3% by weight, from 0.01 to 2% by weight, from 0.01 to 1% by weight. Alternatively, the initiator can be present in the polymerizable composition in an amount of from 0.001 to 10% by weight, from 0.002 to 10% by weight, from 0.004 to 10% by weight, from 0.006 to 10% by weight, from 0.008 to 10% by weight.

The size of the adsorbent beads according to the present application can be controlled by the stirring rate during polymerization, in which the average size of the beads decreases at higher stirring rates.

The stirring process or the mixing process according to the present application can be conducted at a particular desired speed using the mechanical mixer. The stirring process or the mixing process can be performed at a speed of about 100 rpm, about 150 rpm, about 200 rpm, about 250 rpm, about 300 rpm, about 350 rpm, about 400 rpm, about 450 rpm, or about 500 rpm. Preferably, the stirring process or the mixing process is performed at a speed of from 100 to 400 rpm, from 150 to 350 rpm, from 150 to 300 rpm, or from 200 to 250 rpm.

According to the present application, the adsorbent beads can have different diameter. For example, the diameter of the adsorbent beads can be from about 1 μm to about 10 mm, from about 5 μm to about 5 mm, from about 10 μm to about 5 mm, from about 20 μm to about 5 mm, from about 30 μm to about 2 mm, from about 40 μm to about 2 mm, from about 50 μm to about 2 mm, from about 100 μm to about 2 mm, from about 150 μm to about 2 mm, from about 200 μm to about 2 mm, from about 250 μm to about 2 mm, from about 300 μm to about 2 mm, from about 350 μm to about 2 mm, from about 400 μm to about 2 mm, from about 450 μm to about 2 mm, from about 600 μm to about 2 mm, from about 650 μm to about 2 mm, from about 700 μm to about 2 mm, from about 750 μm to about 2 mm, or from about 800 μm to about 2 mm. Alternatively, the diameter of the adsorbent beads can be from about 100 μm to about 2000 μm, from about 100 μm to about 1500 μm, from about 150 μm to about 1200 μm, from about 200 μm to about 1200 μm, from about 250 μm to about 1200 μm, from about 300 μm to about 1200 μm, from about 300 μm to about 1100 μm, from about 300 μm to about 1000 μm, from about 300 μm to about 900 μm, from about 350 μm to about 900 μm, from about 350 μm to about 850 μm.

The beads (i.e. the adsorbent beads and/or modified adsorbent beads) according to the present application can be fairly smooth, have a rough surface, or have a rough and porous structure. In some embodiments, the beads according to the present application have micropores (i.e. they have pores with diameters less than 2 nm). In some embodiments, the beads of the present application are mesopores (i.e. they have pore diameters between 2 nm and 50 nm). In other embodiments of the present application, the beads are macropores (i.e. they have pore diameters of greater than 50 nm).

Surface area, total pore volume, and pore size distribution data define the porous nature of the beads. These characteristics can be measured by $N_2$ sorption and Hg intrusion techniques, which both depend on penetration of these fluids into the pores. $N_2$ sorption is more suitable for evaluating micro- and mesopores but gives less data about macropores. On the other hand, Hg intrusion is only able to provide data about macropores and mesopores but not about micropores. These methods are complimentary to each other, and the proper one should be chosen depending on the type of the particle.

The beads (i.e. the adsorbent beads and/or modified adsorbent beads) according to the present application can have individual pores with a volume (i.e. pore volume) of from 0.524 $nm^3$ to 4.19 $\mu m^3$. Preferably, the beads according to the present application have a pore volume of from 525 $nm^3$ to 1.77 $\mu m^3$. More preferably, the beads according to the present application have a pore volume from 4190 $nm^3$ to 0.524 $\mu m^3$.

The specific surface area of the beads (i.e. the adsorbent beads and/or modified adsorbent beads) according to the present application can be from 1 $cm^2/g$ to 7000 $m^2/g$. Preferably, the beads according to the present application have a specific surface area of from 0.1 to 100 $m^2/g$ or from 0.5 to 50 $m^2/g$. More preferably, the beads according to the present application have a specific surface area of from 1 to 20 $m^2/g$.

The average pore diameter of the beads (i.e. the adsorbent beads and/or modified adsorbent beads) according to the present application can be from 1 to 2000 nm. Preferably, the beads according to the present application have an average pore diameter of from 10 to 1500 nm. More preferably, the beads according to the present application have an average pore diameter from 20 to 1000 nm.

The beads (i.e. the adsorbent beads and/or modified adsorbent beads) according to the present application can have a pore-size distribution (PSD) of from 10 to 1500 nm. Preferably, the beads according to the present application have a pore-size distribution of from 20 to 1000 nm. More preferably, the beads according to the present application have a pore-size distribution from 50 to 800 nm.

The one or more adsorbent beads according to the present application can also include a surfactant. According to this application, any suitable surfactant described above can be used in this case.

In one embodiment, the process for the production of one or more modified adsorbent beads can further include modifying the one or more adsorbent beads on their surface with a surfactant. Any suitable surfactant described above can be used.

In one embodiment, the one or more adsorbent beads comprise the following structure:

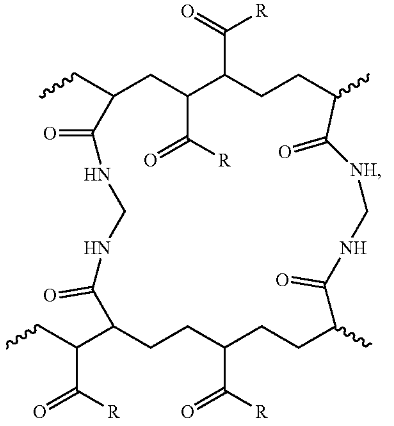

wherein  represents points of attachment to other polymerized monomers.

Another aspect of the present application relates to a process for the production of one or more adsorbent beads. This method includes:

providing a first monomer of Formula (I):

(I)

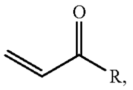

wherein

R is selected from the group consisting of $NH_2$, $NHR^1$, $NR^1R^2$, —NH-A-$NR^1R^2$,

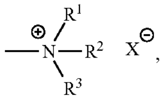 , and 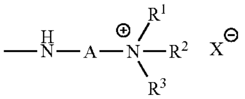 ;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen;

providing a second monomer of Formula (II):

(II)

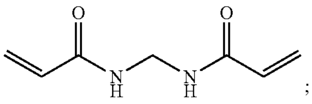 ;

and polymerizing the first monomer of Formula (I) and the second monomer of Formula (II) under conditions effective to produce one or more adsorbent beads.

The step of polymerizing the first monomer of Formula (I) and the second monomer of Formula (II) to produce one or more adsorbent beads is carried out as described above.

Another aspect of the present application relates to a polymerizable composition. The polymerizable composition comprises:

(a) the one or more adsorbent beads according to the present application;

(b) a second monomer of Formula (II):

(II)

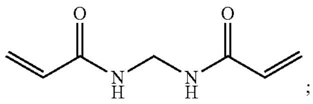

;

and (c) a third monomer of Formula (III):

(III)

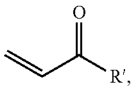

wherein

R' is selected from the group consisting of $NH_2$, $NHR^{1'}$, $NR^{1'}R^{2'}$, —NH-A-$NR^{1'}R^{2'}$,

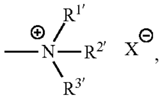

, and

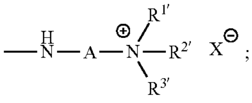

;

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen.

The second monomer used in this aspect of the present application can be the same type of second monomer as those described above in the amounts described above.

Suitable monomers that can be used as the third monomer of Formula (III) according to the present application are (3-acrylamidopropyl)trimethylammonium chloride (APTMAC), acrylamide (AAm), N-[3-(N,N-dimethylamino)propyl] acrylamide (DMAPA), and N-(3-aminopropyl)methacrylamide hydrochloride (APMA). In one embodiment, the third monomer of Formula (III) is (3-acrylamidopropyl) trimethylammonium chloride (APTMAC).

In one embodiment, the first monomer of Formula (I) and the third monomer of Formula (III) are the same. In another embodiment, the first monomer of Formula (I) and the third monomer of Formula (III) are different.

According to the present application, the second monomer of Formula (II), the third monomer of Formula (III), and water are added to the one or more dried adsorbent beads according to the present application prepared as described above. The mixture is kept at about 20° C., about 30° C., 40° C., about 50° C., about 60° C., about 70° C., about 80° C., about 90° C., or about 100° C. for at least 2 hours, at least 4 hours, at least 6 hours, at least 8 hours, at least 10 hours, at least 12 hours, at least 14 hours, at least 16 hours, at least 18 hours, at least 20 hours, at least 22 hours, or at least 24 hours. If at this step the adsorbent beads achieve the maximum swelling of the core of the particles, the highest loading of the second monomer of Formula (II) and the third monomer of Formula (III) inside the pores of the adsorbent beads will be achieved.

Next, the initiator is added and mixed carefully. Any suitable initiator previously described in the present application can be used. At this step surfactant and/or porogen can also be added. Any suitable surfactant and/or porogen described in the present application can be used. The mixture is then immediately transferred into a reactor containing an organic solvent. Suitable organic solvents include 1-hexanol, 1-octanol, 1-decanol, and limonene. The reaction mixture is stirred at about 40° C., about 50° C., about 60° C., about 70° C., about 80° C., about 90° C., or about 100° C. for at least 1 hour, at least 2 hours, at least 3 hours, or at least 4 hours. The beads are then washed with aqueous base solutions, saturated salt solutions, and water. Any suitable base solutions and saturated salt solutions described above can be used. The resulting adsorbent beads can be dried using any suitable method, if desired.

In some embodiments, the resulting adsorbent beads are fractionated using techniques such as sieving, screening, sedimentation, and air classification.

One embodiment relates to the one or more modified adsorbent beads produced by polymerizing the polymerizable composition according to the procedures described above.

Another aspect of the present application relates to a process for the production of a one or more modified adsorbent beads. The one or more modified adsorbent beads comprises:

providing the one or more adsorbent beads according to the present application;

providing a second monomer of Formula (II):

(II)

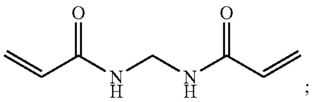

;

providing a third monomer of Formula (III):

(III)

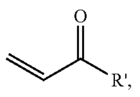

wherein

R' is selected from the group consisting of $NH_2$, $NHR^{1'}$, $NR^{1'}R^{2'}$, —NH-A-$NR^{1'}R^{2'}$,

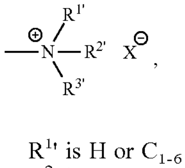

, and

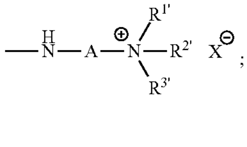

;

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen; and polymerizing the one or more adsorbent beads, the second monomer of Formula (II), and the third monomer of Formula (III) to produce one or more modified adsorbent beads.

The process of polymerizing the one or more adsorbent beads, the second monomer of Formula (II), and the third monomer of Formula (III) to produce one or more modified adsorbent beads is carried out as described above.

Another aspect of the present application relates to a polymerizable composition. The polymerizable composition comprises:

(a) a first monomer of Formula (I):

(I)

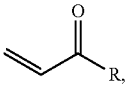

wherein

R is selected from the group consisting of $NH_2$, $NHR^1$, $NR^1R^2$, —NH-A-$NR^1R^2$,

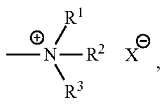

and

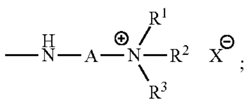

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen;

(b) a second monomer of Formula (II):

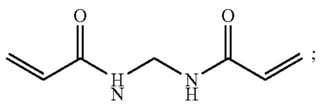

and (c) a third monomer of Formula (III):

(III)

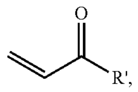

wherein

R' is selected from the group consisting of $NH_2$, $NHR^{1'}$, $NR^{1'}R^{2'}$, —NH-A-$NR^{1'}R^{2'}$,

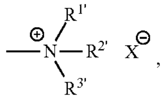

and

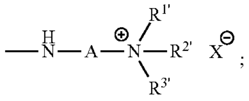

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen, wherein the third monomer of Formula (III) is different from the first monomer of Formula (I).

Another aspect of the present application relates to a process for the production of one or more modified adsorbent beads. This process includes:

providing a first monomer of Formula (I):

(I)

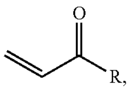

wherein

R is selected from the group consisting of $NH_2$, $NHR^1$, $NR^1R^2$, —NH-A-$NR^1R^2$,

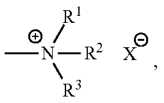

and

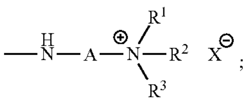

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl;

X is halogen;

providing a second monomer of Formula (II):

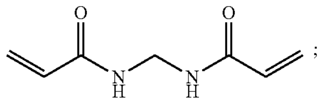

providing a third monomer of Formula (III):

(III)

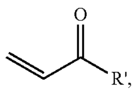

wherein

R' is selected from the group consisting of $NH_2$, $NHR^{1'}$, $NR^{1'}R^{2'}$, —NH-A-$NR^{1'}R^{2'}$,

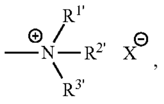

and

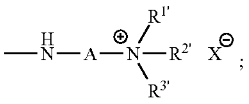

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl;

X is halogen, wherein the third monomer of Formula (III) is different from the first monomer of Formula (I); and polymerizing the first monomer of Formula (I), the second monomer of Formula (II), and the third monomer of Formula (III) to produce one or more modified adsorbent beads.

The process of polymerizing the first monomer of Formula (I), the second monomer of Formula (II), and the third monomer of Formula (III) to produce one or more modified adsorbent beads is carried out using the conditions and reagents described above.

Another aspect of the present application relates to one or more adsorbent beads comprising a polymerized first monomer of Formula (I)

(I)

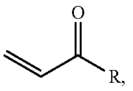

wherein

R is selected from the group consisting of $NH_2$, $NHR^1$, $NR^1R^2$, —NH-A-$NR^1R^2$,

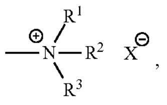

and

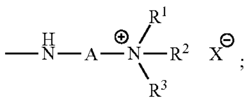

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen.

In one embodiment, one or more adsorbent beads further comprises:

a polymerized second monomer of Formula (II):

(II)

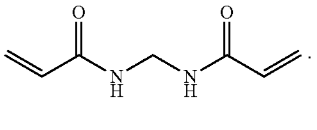

These beads have the properties described above.

In one embodiment, one or more adsorbent beads further comprises:

a polymerized third monomer of Formula (III):

(III)

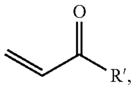

wherein

R' is selected from the group consisting of $NH_2$, $NHR^{1'}$, $NR^{1'}R^{2'}$, —NH-A-$NR^{1'}R^{2'}$,

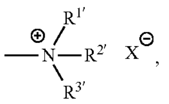

and

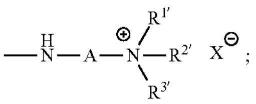

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen, wherein the third monomer of Formula (III) is different from the first monomer of Formula (I).

Another aspect of the present application relates to a method for heparin recovery. This method includes:

providing a heparin source;

providing a one or more adsorbent beads according to the present application;

contacting the heparin source with the one or more adsorbent beads to absorb heparin on the one or more adsorbent beads; and eluting absorbed heparin from the one or more adsorbent beads.

Any suitable heparin source can be used according to the present application. For example, crude heparin from an animal mucosa, crude heparin from porcine mucosa, crude heparin from bovine mucosa, crude heparin from ovine mucosa, and crude heparin from clam can be used as a heparin source. In one embodiment, the heparin source is a crude heparin from an animal mucosa. In another embodiment, the heparin source is a crude heparin from porcine mucosa.

The ratio of the adsorbent beads resin in relation to the heparin source can be from 0.1 to 80 wt %. Preferably, the ratio of the adsorbent beads resin in relation to the heparin source is from 1 to 50 wt %, from 2 to 45 wt %, from 3 to 40 wt %, from 4 to 35 wt %, from 5 to 30 wt %, from 5 to 25 wt %, from 5 to 20 wt %, from 5 to 15 wt %, or from 5 to 10 wt %. More preferably, the ratio of the adsorbent beads resin in relation to the heparin source is 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

The heparin source is contacted with one or more adsorbent beads (i.e. adsorbent beads or modified adsorbent beads) described in the present application. The step of contacting the heparin source with one or more beads can be performed using any conventional methods.

The beads can be used when almost dry or can be previously preconditioned. For example, the adsorbent beads can be soaked in water, buffer solution, salt solution, aqueous surfactant solution, or the like. Alternatively, the beads can be washed with water, buffer solution, salt solution, aqueous surfactant solution, or the like just prior to the contact with the heparin source.

The heparin source can be used as is or diluted in water, buffer solution, salt solution, aqueous surfactant solution, or the like before the step of contacting the heparin source with one or more adsorbent beads.

The step of contacting the heparin source with the one or more adsorbent beads can be conducted at a variety of different conditions, including, but limited to different pH, different temperatures, and different reaction times.

The adsorbent beads can be contacted with a heparin source in a reactor for a period of time. For example, the adsorbent beads can be present in a column and the heparin source is allowed to pass though the column. In some embodiments, the heparin source can be passed through a filter or membrane. In some embodiments, the heparin source can be passed through the column, filter, or membrane containing adsorbent beads multiple times.

The step of contacting the heparin source with the one or more adsorbent beads can be performed for at least 24 hours, at least 18 hours, at least 12 hours, at least 8 hours, at least 7 hours, at least 6 hours, at least 5 hours, at least 4 hours, at least 3 hours, at least 2 hours, at least 1 hour, at least 45 minutes, at least 30 minutes, at least 15 minutes, at least 10 minutes, or at least 5 minutes. Preferably, the step of contacting the heparin source with the one or more adsorbent beads is performed for at least at least 12 hours, at least 8 hours, at least 7 hours, at least 6 hours, at least 5 hours, at least 4 hours, at least 3 hours, at least 2 hours, or at least 1 hour. Alternatively, the step of contacting the heparin source with the one or more adsorbent beads is performed for at least 1 second, at least 5 seconds, at least 10 seconds, at least 15 seconds, at least 20 seconds, at least 30 seconds, at least 40 seconds, at least 50 seconds, at least 1 minute, at least 2 minutes, at least 3 minutes, at least 4 minutes, at least 5 minutes, at least 10 minutes, at least 15 minutes, at least 20 minutes, at least 25 minutes, at least 30 minutes, at least 35 minutes, at least 40 minutes, at least 45 minutes, at least 50 minutes, or at least 55 minutes.

The step of contacting the heparin source with the one or more adsorbent beads can be performed at a pH between 3 to 11 or between 6 to 10. Preferably, the step of contacting the heparin source with the one or more adsorbent beads is performed at a pH between 7 to 10, between 8 to 10, between 9 to 10, between 8 to 9, or between 7 to 8.

The step of contacting the heparin source with the one or more adsorbent beads can be performed at room temperature or at elevated temperatures. For example, contacting the heparin source with the one or more adsorbent beads can be performed at about 20° C., about 25° C., about 30° C., 40° C., about 50° C., about 60° C., about 70° C., about 80° C., about 90° C., or about 100° C.

The step of contacting the heparin source with the one or more adsorbent beads can be performed with stirring or without stirring.

In one embodiment, the desired amount of the adsorbent beads according to the present application soaked in Milli-Q water is added to the heparin source. Either adsorbent beads or modified adsorbent beads can be used. The mixture is stirred for a time necessary to achieve the adsorption of a heparin.

Once adsorption is completed, the adsorbent beads can be recovered. In one embodiment, the adsorbent beads are recovered by filtration.

Then, the adsorbent beads are washed with a aqueous solutions and water to remove unbound impurities. Suitable aqueous solutions that can be used for washing the adsorbent beads include, but are not limited to, saturated salt solutions (such as NaCl solution). Any other suitable saturated salt solution described in the present application can also be used.

The heparin is desorbed by washing the adsorbent beads with the saturated salt solutions at about 20° C., about 30° C., 40° C., about 50° C., about 60° C., about 70° C., about 80° C., about 90° C., or about 100° C. for at least 30 minutes, at least 45 minutes, at least 1 hour, at least 2 hours, at least 3 hours, at least 4 hours, at least 6 hours, at least 8 hours, at least 10 hours, at least 12 hours, at least 14 hours, at least 16 hours, at least 18 hours, at least 20 hours, at least 22 hours, or at least 24 hours. Suitable saturated salt solution that can be used include NaCl solution or KCl solution. The eluted heparin is then precipitated from the saturated salt solution by using an alcohol. Suitable alcohols that can be used include methanol, ethanol, and i-propanol. The precipitate can be collected by centrifugation and dried.

The amount of the heparin that can be recovered using the methods described in the present application can vary. For example, the eluting can recover at least 99 weight % of the heparin in the provided heparin source, at least 95 weight % of the heparin in the provided heparin source, at least 90 weight % of the heparin in the provided heparin source, at least 85 weight % of the heparin in the provided heparin source, at least 80 weight % of the heparin in the provided heparin source, at least 75 weight % of the heparin in the provided heparin source, at least 70 weight % of the heparin in the provided heparin source, at least 65 weight % of the heparin in the provided heparin source, at least 60 weight % of the heparin in the provided heparin source, at least 55 weight % of the heparin in the provided heparin source, at least 50 weight % of the heparin in the provided heparin source, at least 45 weight % of the heparin in the provided heparin source, at least 40 weight % of the heparin in the provided heparin source, at least 35 weight % of the heparin in the provided heparin source, at least 30 weight % of the heparin in the provided heparin source, or at least 25 weight % of the heparin in the provided heparin source.

The concentration of heparin in biological samples is extremely low (~0.01 wt %). Furthermore, the digested mucosa contains several competitive species, including proteins, nucleic acids, and other GAGs (specially chondroitin sulfate and dermatan sulfate). While the heparin that is recovered using the methods described in the present application contains dermatan sulfate (DS) and chondroitin sulfate (CS) as contaminants, the same contaminants are present in the heparin eluted from the commercial resins.

Once the absorbed heparin is eluted from the adsorbent beads according to the present application, the adsorbent beads can be regenerated and used again for heparin adsorption. The adsorbent beads can be regenerated by washing with various aqueous solutions, such as saturated salt solutions and/or basic solutions, followed by washing with water. For example, the adsorbent beads described in the present application can be regenerated by washing with NaOH solution at 50° C. followed by washing with Milli-Q water. The adsorbent beads can also be regenerated by washing with NaOH solution at 50° C. and saturated NaCl solutions. Any other suitable saturated salt solutions and basic solutions described in the present application can also be used.

The adsorbent beads described in the present application can be used repeatedly for heparin adsorption without a decrease in their performance. The adsorbent beads described in the present application showed reusability through multiple consecutive adsorption-desorption-regeneration cycles.

The above disclosure is general. A more specific description is provided below in the following examples. The examples are described solely for the purpose of illustration and are not intended to limit the scope of the present application. Changes in form and substitution of equivalents are contemplated as circumstances suggest or render expedient. Although specific terms have been employed herein, such terms are intended in a descriptive sense and not for purposes of limitation.

EXAMPLES

The examples below are intended to exemplify the practice of embodiments of the disclosure but are by no means intended to limit the scope thereof.

Example 1—Materials

AAm (99+%, Acros Organics), APTMAC aqueous solution (75 wt %, Santa Cruz Biotechnology), BisAAm (99+%, Alfa Aesar), APS (>98%, Sigma-Aldrich), PVOH (fully hydrolyzed MW~60000 g/mol), AOT (96%, VWR), heparin sodium salt (Celsus Laboratories), deuterium oxide (99.9%, Cambridge Isotopes, Inc.), hydrochloric acid (37%, Fisher Scientific), calcium chloride, sodium hydroxide, denatured ethanol, and 1-hexanol, and analytical grade methanol, acetone, and hexanes were all used as received. Mazola corn oil was purchased from a local market. DI water was used for all of the polymerization experiments, while Milli-Q water was used for the adsorption experiments. Porcine intestinal mucosa (heparin content of ~500 mg $L^{-1}$) was provided from Shineway (WH Group, China). Amberlite FPA98 $C_1$, an industrially available resin for heparin recovery, was purchased from Dow Chemical, U.S.

Example 2—Characterization

Attenuated total reflectance Fourier transform infrared spectra (ATR-FTIR) were measured with a Shimadzu IRAffinity-1S spectrophotometer. Thermogravimetric analysis (TGA) of samples in the range of 25-800° C. (10° C. $min^{-1}$, air flow) were recorded using a TA Q100 instrument. The $^1$H-NMR spectra were measured in deuterium oxide by a Bruker INOVA 500 NMR spectrometer at 23° C. Samples were coated with a thin gold layer using a sputter coater and then scanning electron microscopy (SEM) was performed using a Zeiss Gemini 500 Field Emission SEM. The heparin ELISA kit (MyBiosource San Diego, CA, USA) and a SpectraMax iD3 multi-mode microplate reader (Molecular Devices; Sunnyvale, CA) were used to measure the heparin concentration remaining in the mucosa after the adsorption by the resin samples.

Example 3—Inverse Suspension Polymerization for the Synthesis of Cross-Linked Spherical Polymer Beads as Heparin Adsorbents All resin samples were synthesized using inverse suspension polymerization, in which the polymerization reagents in the aqueous phase were dispersed in corn oil as organic phase. A typical polymerization procedure was as follows (Scheme 1) (in some formulations AAm was used as the neutral monomer to tune the bead properties (e.g. swelling)). In a 200 mL round bottom flask, the required amount of APTMAC was added followed by the addition of BisAAm, AAm (for some resin formulations), water, AOT (for some formulations), and PVOH. A stock solution of 10.0 w/v % PVOH was used to avoid time-consuming dissolution of PVOH at room temperature. In formulations with a higher degree of crosslinking, methanol was added to help dissolution of the BisAAm in the mixture to avoid using excess water that can result in high swelling of the synthesized resins (Men et al., "Preparation of Cationic Functional Polymer Poly (Acryloxyethyltrimethyl Ammonium Chloride)/$SiO_2$ and its Adsorption Characteristics for Heparin," *Korean J. Chem. Eng.* 34(7):1889-1895 (2017), which is hereby incorporated by reference in its entirety). The mixture was stirred at 200 rpm for 15 min at room temperature to obtain a transparent solution, followed by 1 min sonication (in an ultrasonic bath) to defoam the mixture. The APS initiator was then added and carefully dissolved in the solution by gentle mixing to avoid formation of a stable foam. This mixture was then quickly added to the corn oil in a 500 mL jacketed glass reactor equipped with a EUROSTAR 60 IKA overhead stirrer while it was stirred at 250 rpm using a foldable paddle Teflon coated stirring shaft. The mixture was stirred while the temperature of the reactor was increased from 25 to 70° C. by means of a water bath circulator. The reaction continued for 3 hours. The majority of corn oil was then removed by simple decantation and the reaction mixture was poured into a 2 L beaker containing 500 mL of hexanes and stirred at 60° C. for 30 min, vacuum filtered, and washed with excess ethanol. Then the product was washed with water (2 L at 75° C.) for 2 hours, vacuum filtered, and washed with 5.0 w % NaOH solution (500 mL at 50° C.), followed by saturated NaCl solution (500 mL at 50° C.). All of the resins were washed with Milli-Q water before use in the heparin adsorption experiments. These washing steps are very critical and necessary to remove unreacted monomer(s), porogen, initiator, and surfactant (if any) from the resin. This ensures that no harmful materials would be introduced into the eluted heparin. Table 1 shows the reaction conditions and composition of the synthesized resin (for all of the resins, the reaction temperature was 70° C. and 2 mole % of initiator APS was used).

TABLE 1

Reaction Conditions and Samples Codes for the Reverse Suspension Polymerization Used to Produce the Polymer Bead Heparin Adsorbents

| Sample code | Type of cross-linked polymer bead | APTMAC:AAm (mol %) | Cross-linking density (mol %) | PVOH conc. (w %)[a] | AOT (w %)[a] | Oil-water v/v ratio | Total activity of eluted heparin U $g^{-1, b}$ |
|---|---|---|---|---|---|---|---|
| R1 | APTMAC-AAm copolymer | 75:25 | 20 | 0.6 | — | 75:25 | 36.9 ± 1.6 |
| R2 | APTMAC homopolymer | 100:0 | 25 | 1.5 | — | 70:30 | 44.0 ± 3.1 |
| R3 | APTMAC homopolymer | 100:0 | 20 | 1.5 | — | 70:30 | 45.7 ± 2.7 |
| R4 | APTMAC homopolymer | 100:0 | 15 | 2.0 | 1.0 | 70:30 | 46.8 ± 2.9 |
| R5 | AAm-APTMAC IPN | 34:66[c] | 15[d] | 1.54 | — | 75:25[d] | 42.4 ± 3.1 |
| R6 | AAm-APTMAC IPN | 50:50[c] | 15[d] | 1.54 | — | 75:25[d] | 44.6 ± 2.8 |
| R7 | APTMAC-AAm copolymer | 75:25 | 10 | 2.5 | 1.7 | 70:30 | 45.7 ± 3.3 |

TABLE 1-continued

Reaction Conditions and Samples Codes for the Reverse Suspension Polymerization Used to Produce the Polymer Bead Heparin Adsorbents

| Sample code | Type of cross-linked polymer bead | APTMAC:AAm (mol %) | Cross-linking density (mol %) | PVOH conc. (w %)[a] | AOT (w %)[a] | Oil-water v/v ratio | Total activity of eluted heparin U $g^{-1}$, [b] |
|---|---|---|---|---|---|---|---|
| R8 | APTMAC-AAm copolymer | 90:10 | 10 | 5.0 | 1.7 | 70:30 | 53.2 ± 3.5 |
| R9 | APTMAC-AAm copolymer | 75:25 | 10 | 2.5 | 2.0 | 70:30 | 64.7 ± 3.4[e] |

[a]Weight percentage of the component in the final product.
[b] The measurements were triplicate and the mean value is reported. For comparison, the total activity of the eluted heparin from the commercial Amberlite FPA98 Cl is 55.0 ± 2.1 U per gram of mucosa.
[c] The overall ratio of the APTMAC:AAm (for IPN resins APTMAC was added in the second step).
[d]The condition for the first step, i.e., synthesis of the X-AAm bead as the IPN core.
[e] The average of 5 consecutive measurements including adsorption, desorption, and regeneration.

Scheme 1. Synthesis of the PolyAPTMAC (PAPTMAC) Beads Cross-Linked by BisAAm via Inverse Suspension Polymerization in Corn Oil

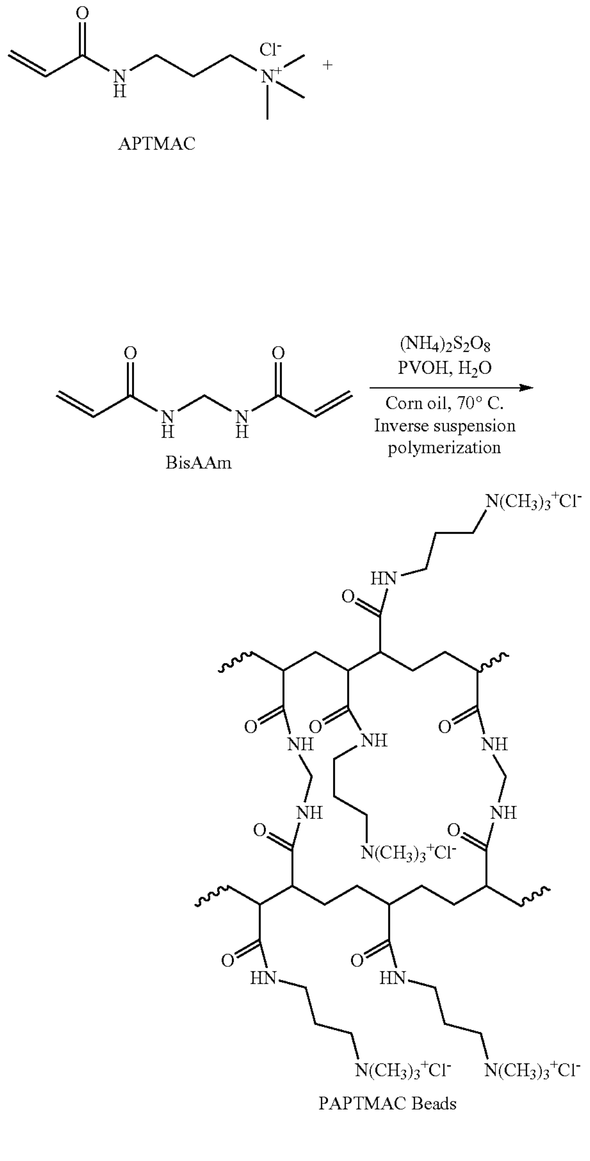

APTMAC

BisAAm

PAPTMAC Beads

Example 4—Inverse Suspension Polymerization for the Synthesis of IPN Beads as Heparin Adsorbents For the preparation of the IPN resins, first the cross-linked polyacrylamide (X-AAm) beads were synthesized based on the methodology described in the previous section. For the second step, which involved the polymerization of APTMAC inside the pores of the X-AAm beads, the following methodology was performed (Scheme 2). In a 200 mL round bottom flask, the desired amount of well dried cross-linked X-AAm beads was added followed by the addition of APTMAC (75% in water), BisAAm, and water. The mixture was kept at 50° C. for 12 hours to achieve maximum swelling of the hydrophilic and porous X-AAm core and therefore highest loading of the APTMAC monomer and cross-linker inside the pores of X-AAm beads. The water content was chosen in a way so that no bulk water remained after this maximum swelling to ensure minimum off-site polymerization occurred outside of the X-AAm beads. After 12 hours, the required amount of APS initiator in 2 mL water was added and mixed carefully and the mixture was immediately transferred to a 500 mL glass reactor containing 1-hexanol at 70° C. while stirring at 250 rpm with the mechanical mixer. The reaction continued for 3 hours and the final polymer beads were washed according to the method described in the previous section and prepared for the heparin adsorption experiments which is explained in the next section.

Scheme 2. The Two-Step Synthesis of the IPN Beads, Which Involved Inverse Suspension Polymerization of AAm in Corn Oil and APTMAC in 1-Hexanol Step 1:

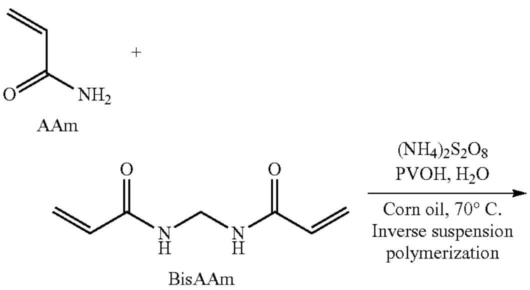

AAm

BisAAm

-continued

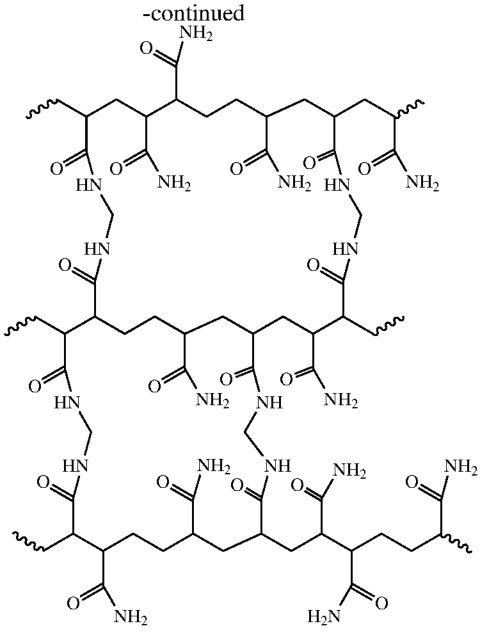

X-AAm Beads

-continued

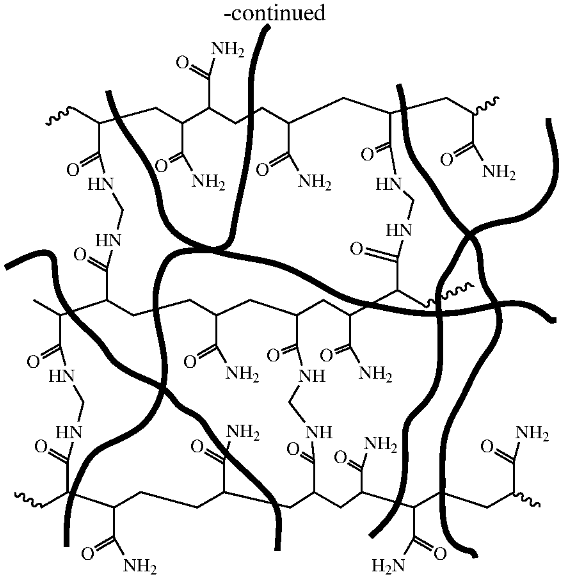

PAAm-PAPTMAC IPN Beads

Step 2:

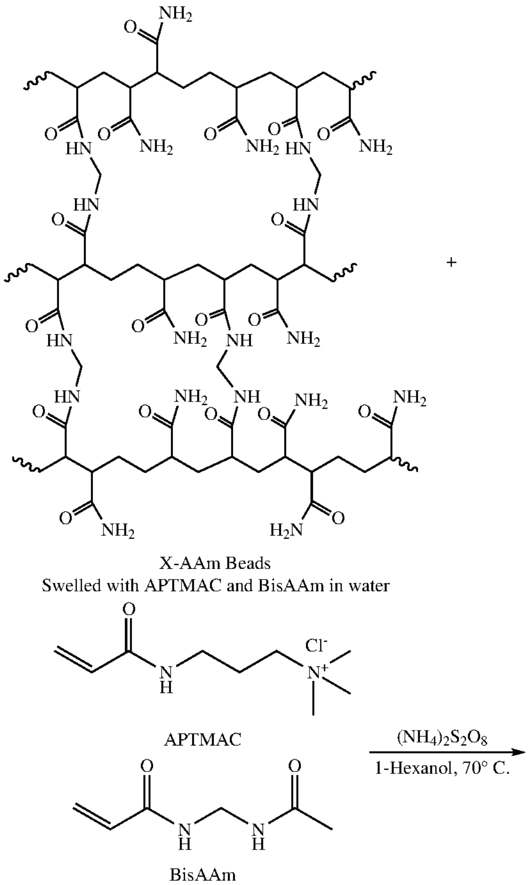

BisAAm

Example 5—Heparin Adsorption Experiments

In order to evaluate the performance of the synthesized resins for heparin adsorption in a real biological sample, all of the resins were tested for heparin adsorption, and the anticoagulant potency of the eluted heparin was measured using the sheep plasma. Pristine porcine intestinal mucosa was diluted by water and NaCl was added to the mixture and the pH was increased to 8.5 by means of 8 w % NaOH solution. The mixture was heated to 40° C. while stirring with the mechanical stirrer and the protease enzyme was added to digest the mucosa. The temperature was increased to 55° C. and the digestion was continued for 3 hours. The enzyme was deactivated by heating the mixture at 85° C. for 30 min, followed by the addition of cool water (4° C.). The mixture was then filtered to remove any remaining large particles. The desired amount of resin (soaked in Milli-Q water) was added to the digested mucosa and the mixture was stirred for 12 hours at 55° C. The mixture was then filtered using a Nylon cloth (60 mesh) and the recovered resin was washed with water and NaCl 5.0 w % for 30 min at 50° C. to remove the unbound impurities and other GAGs with less negative charge (Dowding et al., "Suspension Polymerisation to Form Polymer Beads," *Colloids Surf Physicochem. Eng. Aspects* 161(2):259-269 (2000), which is hereby incorporated by reference in its entirety). The resin was then filtered and the heparin was desorbed by three steps of washing with saturated NaCl at 50° C. for 3 hours (step 1), 1 hour (step 2), and 1 hour (step 3) followed by collecting the filtrate at each washing step. The eluted heparin in the saturated salt solution was then precipitated by adding ethanol, followed by centrifugation. The resulting pellet was dried in a vacuum oven at 65° C. and then dissolved in 50 mL water to measure the eluted heparin's anticoagulant potency. To calculate the adsorption capacity of the resins ($q_e$, mg $g^{-1}$) the following equation (Eq. 1) was used $$q_e = \frac{(C_0 - C_e) \times V}{m} \tag{1}$$

in which $C_0$ and $C_e$ (mg $L^{-1}$) are the initial and equilibrium heparin concentrations (measured by the ELISA kit), V (L) is the volume of the mucosa solution that was used for heparin adsorption, and m is the mass of the adsorbent resin used (g). Since the heparin content of different mucosa batches can be different, all of the measurements were done using the same batch of mucosa. For large scale measurements of each resin, however, all of the activities were compared to the commercial Amberlite FPA98 Cl resin and normalized based on that.

Example 6—Sheep Plasma Clotting Assay

The method used to measure the anticoagulant potency of isolated heparin via the sheep plasma clotting assay has been described in Cesaretti et al., "Isolation and Characterization of a Heparin with High Anticoagulant Activity from the Clam Tapes Phylippinarum: Evidence for the Presence of a High Content of Antithrombin III Binding Site," *Glycobiology* 14(12):1275-1284 (2004), which is hereby incorporated by reference in its entirety.

Example 7—Results and Discussions of Examples 1-6

Spherical Polymer Beads for Heparin Adsorption

Most methods for heparin recovery are based on its negative charge, typically using ion exchange techniques. To synthesize an anion exchange resin either cationic monomers can be used (Men et al., "Preparation of Cationic Functional Polymer Poly (Acryloxyethyltrimethyl Ammonium Chloride)/$SiO_2$ and its Adsorption Characteristics for Heparin," *Korean J. Chem. Eng.* 34(7):1889-1895 (2017); Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), which are hereby incorporated by reference in their entirety) or a suitable polymer can be functionalized with appropriate cationic groups via post modification (Eskandarloo et al., "Multi-Porous Quaternized Chitosan/Polystyrene Microbeads for Scalable, Efficient Heparin Recovery," *Chem. Eng. J.* 348:399-408 (2018), which is hereby incorporated by reference in its entirety). The first methodology, however, has the advantage of producing a resin that has the functional adsorbent throughout its structure and not only on the surface, which increase the overall efficiency of the resin during the successive adsorption-desorption-regeneration runs. APTMAC as a quaternary ammonium functionalized amide (Scheme 2) is one of the most robust monomers that can be used to synthesize anion exchange resins. Its antimicrobial properties (Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24):5491-5508 (2018); Zhou et al., "In Vivo Anti-Biofilm and Anti-Bacterial Non-Leachable Coating Thermally Polymerized on Cylindrical Catheter," *ACS Appl. Mater. Interfaces* 9(41):36269-36280 (2017), which are hereby incorporated by reference in their entirety), hydrophilic nature (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24):5491-5508 (2018), which are hereby incorporated by reference in their entirety), and amide functionality that is stable over a wide range of pH and temperatures (Lligadas, "Ultrafast SET-LRP with Peptoid Cytostatic Drugs as Monofunctional and Bifunctional Initiators," *Biomacromolecules* 18(8):2610-2622 (2017), which is hereby incorporated by reference in its entirety) make it one of the best commercially available monomers for producing anion exchange resins.

Figure 2:
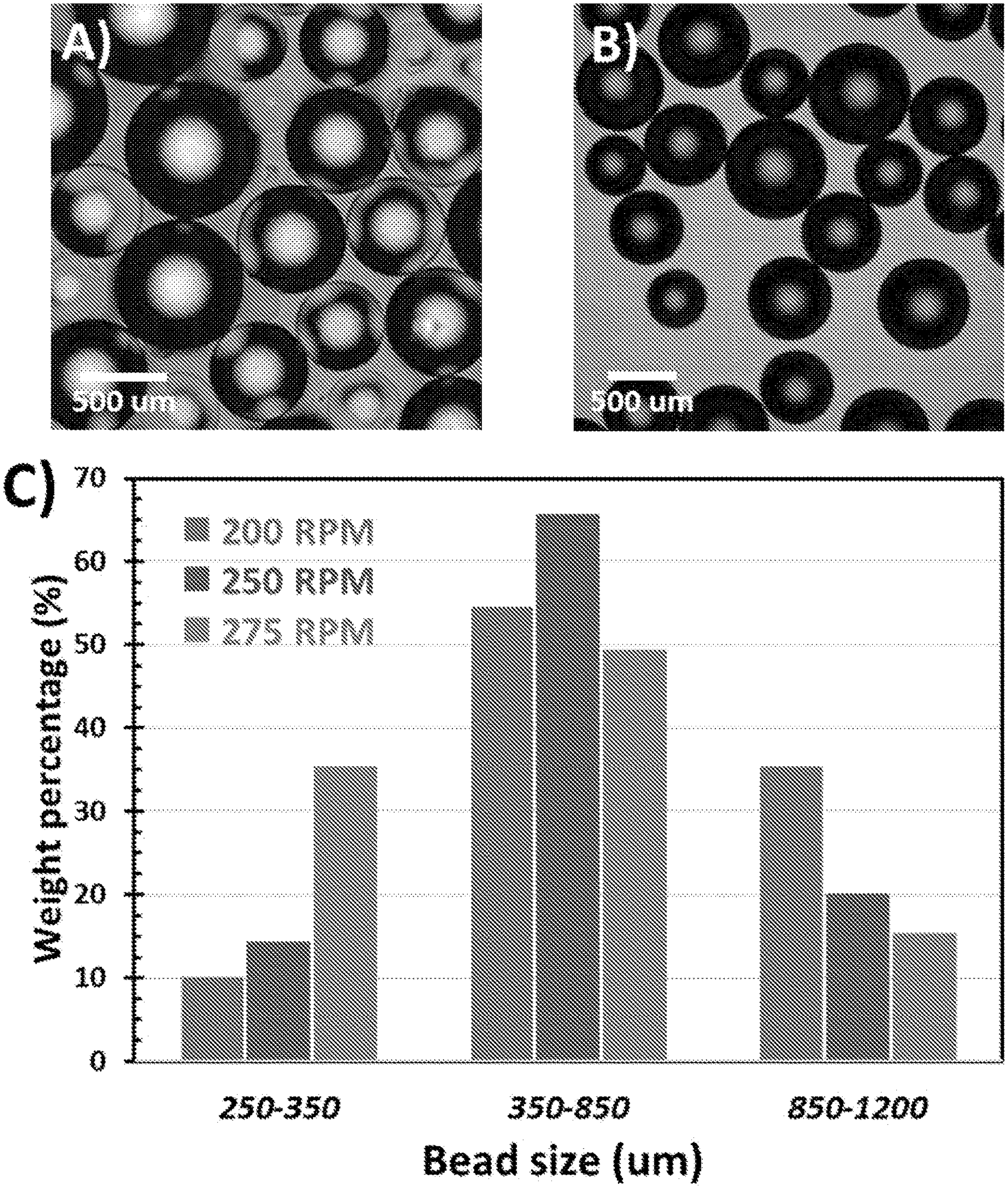
FIGS. 2A-C show light microscopy images of samples R4 (FIG. 2A) and R9 (FIG. 2B) and the size dependency of the spherical resins as a function of the stirring rate during the inverse suspension polymerization (FIG. 2C).

In Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), which is hereby incorporated by reference in its entirety, a simple aqueous radical polymerization was used to synthesize the functional polymer adsorbent in one-pot, followed by drying and grinding to the desired size. Although this methodology is very simple, and does not require any special equipment, the final product needs grinding and sieving. Therefore, the obtained polymer beads were not spherical (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), which is hereby incorporated by reference in its entirety) and might be susceptible to erosion during prolong runs of use and recycling. On the other hand, the inverse suspension polymerization method used in the present application resulted in very spherical and porous cross-linked polymer beads with a diameter range between 250-1200 μm (FIGS. 2A-C). However, as can be seen in FIG. 2C, the majority of the beads (~65 wt %) are in the range of 350-850 The size of the polymer beads can be controlled by the stirring rate during polymerization, in which the average size of the beads decreases at higher stirring rates (FIG. 2C) (Dowding et al., "Suspension Polymerisation to Form Polymer Beads," *Colloids Surf Physicochem. Eng. Aspects* 161(2):259-269 (2000), which is hereby incorporated by reference in its entirety). Table 1 shows the reaction conditions and formulation that were used for the resin synthesis.

From the results of Table 1, some of the characteristics of the bead adsorbent can be correlated, such as the degree of cross-linking, porosity, and hydrophilicity/surface functionality, to the heparin adsorption efficiency of the resin. As a general trend, decreasing the degree of cross-linking has led to higher swelling of the resin compared to higher cross-linked resin, although it was recognized that it also depends on the hydrophilicity of surface functionality. Furthermore, the concentration of the functional group on the adsorbent increases with a decrease in the degree of cross-linking for the same composition of the monomers. This can increase the adsorption efficiency (compare resin R2 and R3 in Table 1). As mentioned before, the hydrophilic/hydrophobic balance of the resin is another important feature of the adsorbent that must be controlled. Using the anionic surfactant, AOT, ensures that more of the cationic monomer APTMAC, which is more hydrophilic compared to AAm, is located on the surface of the resin. Therefore, the resin became more hydrophilic and also more functional (compare R7 and R9 in Table 1). Porosity is another important property of the adsorbent. Here, it was controlled by using the PVOH as porogen. Higher amounts of the porogen can provide higher porosity, leading to higher surface area which, in combination with proper functionality of the surface, can lead to higher adsorption efficiency. With a correct combination of the synthesis variables, especially the monomers and their composition, cross-linking density, porogen concentration, and controlling the surface functionality properties, the adsorbent can be tailored to fit any special application.

Structural Characterization of the Bead Adsorbents

Figure 3:
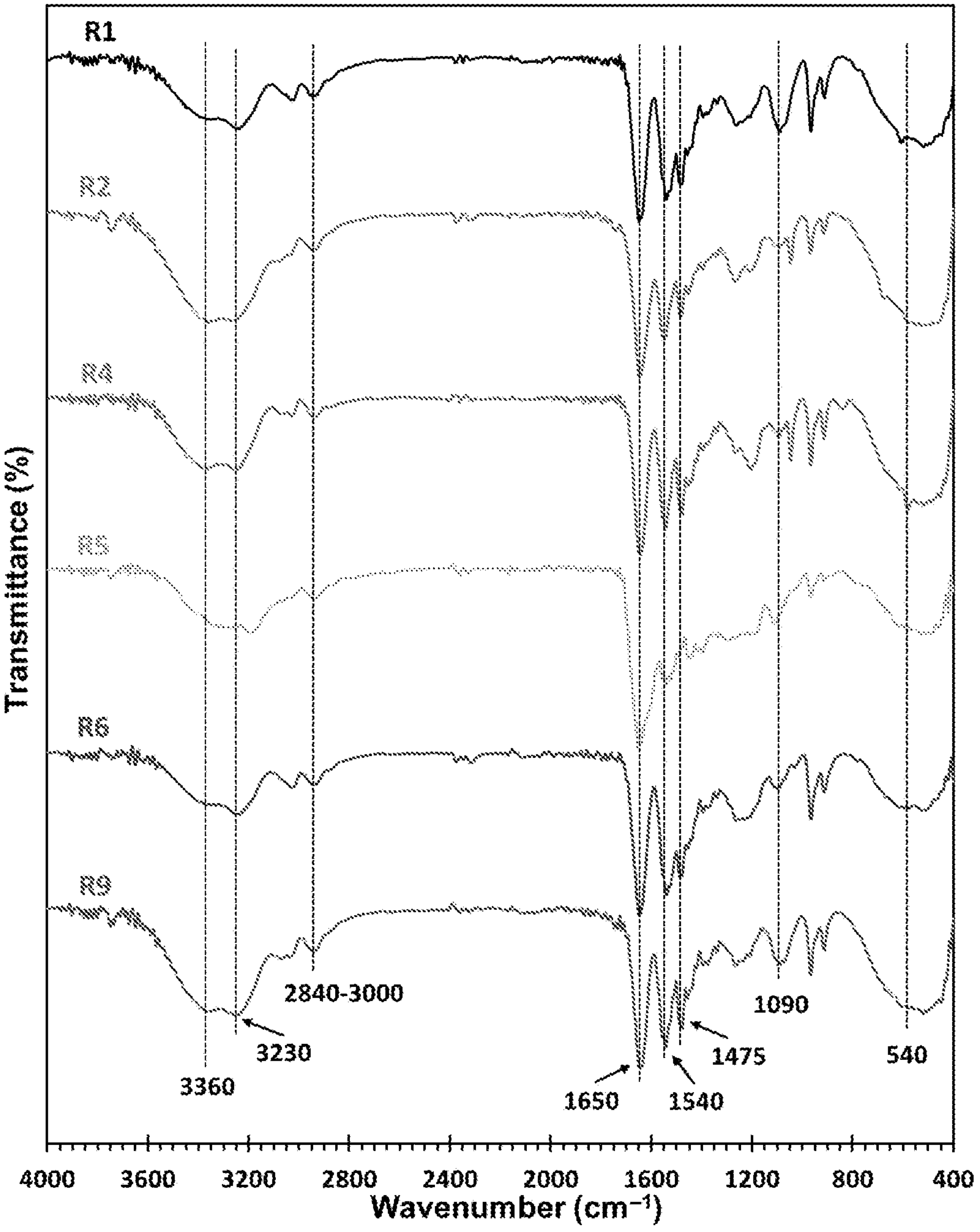
FIG. 3 shows the ATR-FTIR spectra of selected bead adsorbent formulations described in this application. The reaction conditions for each sample are shown in Table 1.

As shown in Table 1, nine bead adsorbents with different formulations were synthesized in either the one step or two step process (IPN resins). The ATR-FTIR spectroscopy was used to confirm the functionality of the resulting resins (FIG. 3). A rather complete explanation of the FTIR spectra of the AAm-APTMAC copolymers and PAPTMAC have been presented in Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), which is hereby incorporated by reference in its entirety. Briefly, the FTIR spectra of the samples show N—H bond vibration at 3360 $cm^{-1}$, the carbonyl group of the amide at 1650 $cm^{-1}$, the secondary amide bond for BisAAm and APTMAC at 1540 $cm^{-1}$, and the C—H stretching band at 2840-3000 $cm^{-1}$. The three characteristic bands of APTMAC (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Rehman et al., "Fast Removal of High Quantities of Toxic Arsenate via Cationic p(APTMAC1) Microgels," *J. Environ. Manage.* 166:217-226 (2016), which are hereby incorporated by reference in their entirety) at 1475, 1545, and 1650 $cm^{-1}$ are present in all spectra except the R5 sample, which featured the lowest APTMAC content (Table 1). In addition to these peaks, the resins that contains AAm (R1, R5, R6, R8) also showed the acrylamide specific bands at 1090 $cm^{-1}$ for the C—C stretching and at 3230 $cm^{-1}$ for the other N—H band of the acrylamide (Murugan et al., "FTIR and Polarised Raman Spectra of Acrylamide and Polyacrylamide," *J. Kor. Phys. Soc.* 32(4):505-512 (1998), which is hereby incorporated by reference in its entirety). These results confirmed the presence of the APTMAC and AAm monomers and BisAAm cross-linker in the resins that are synthesized based of formulations provided in Table 1.

Thermal Stability of the Synthesized Resins

Figure 4:
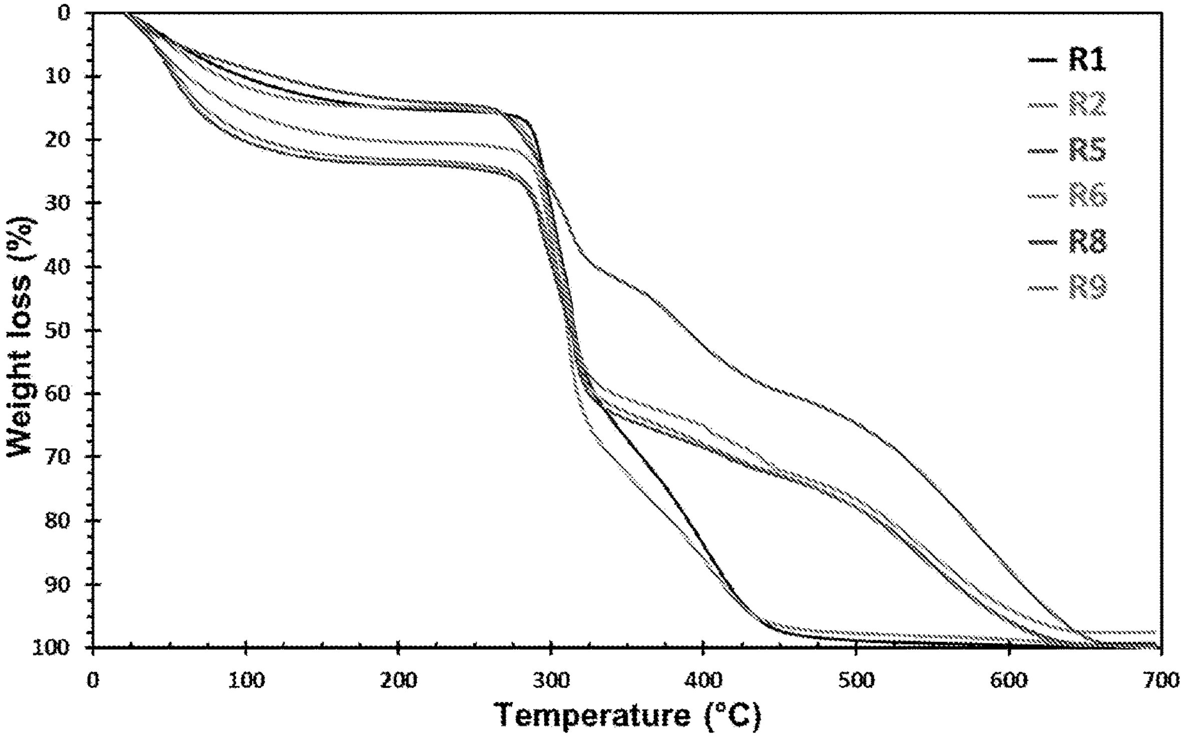
FIG. 4 shows TGA thermograms of the selected samples in the range of 25 to 700° C. under air atmosphere.
Figure 5:
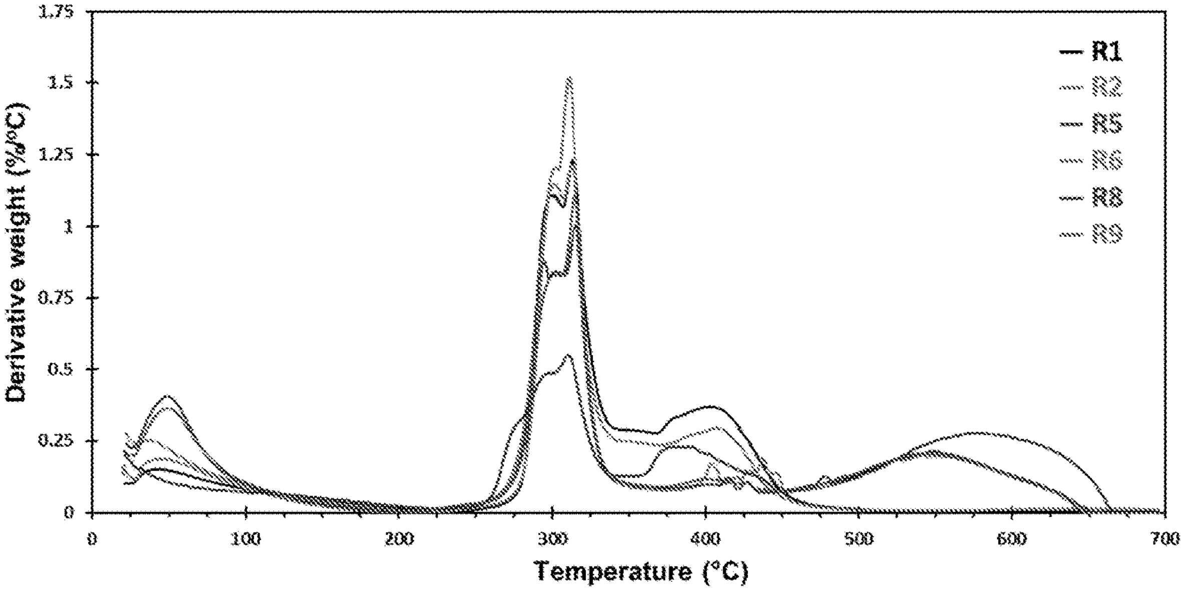
FIG. 5 is a graph showing the differential thermal analysis of the selected samples in the range of 25 to 700° C. under air atmosphere.

Adsorption processes are often performed at moderately high temperatures, as in the case of heparin adsorption, which is preferably run at 55° C. for at least 15 hours (van der Meer et al., "From Farm to Pharma: an Overview of Industrial Heparin Manufacturing Methods," *Molecules* 22(6):1025 (2017), which is hereby incorporated by reference in its entirety). Furthermore, for cost reasons, the re-use of the resin multiple times during successive adsorption-desorption-regeneration cycles should be possible without the material degrading. To investigate the thermal stability of the synthesized samples, selected resins were subjected to TGA in the range of 25 to 700° C. under air atmosphere. As shown in FIG. 4, although the samples were dried in a vacuum oven prior to the TGA measurements, —10-20 wt % of their mass was due to adsorbed water from air as a result of their hydrophilicity. However, the major weight lost occurred at ~300° C. for nearly all the samples (FIGS. 4-5), which is typical for APTMAC polymers (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), Huang et al., "Surface Functionalized $SiO_2$ Nanoparticles With Cationic Polymers via the Combination of Mussel Inspired Chemistry and Surface Initiated Atom Transfer Radical Polymerization: Characterization and Enhanced Removal of Organic Dye," *J. Colloid Interface Sci.* 499:170-179 (2017), which are hereby incorporated by reference in their entirety). This major weight loss at 300° C. is followed by two other weight losses at approximately 400° C. and 550° C. related to the PAAm (FIG. 5). Sample R5 featured the highest thermal stability, which is reasonable given that this formulation had the highest ratio of AAm to APTMAC, in which AAm has a higher thermal stability compared to APTMAC (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019), which is hereby incorporated by reference in its entirety). The TGA thermograms of samples R3 and R4 are almost identical to the TGA of the R2 sample. Also, the TGA thermogram of sample R7 is exactly like the TGA of sample R9 due to the same chemical composition.

Morphological Study by SEM

Figure 6:
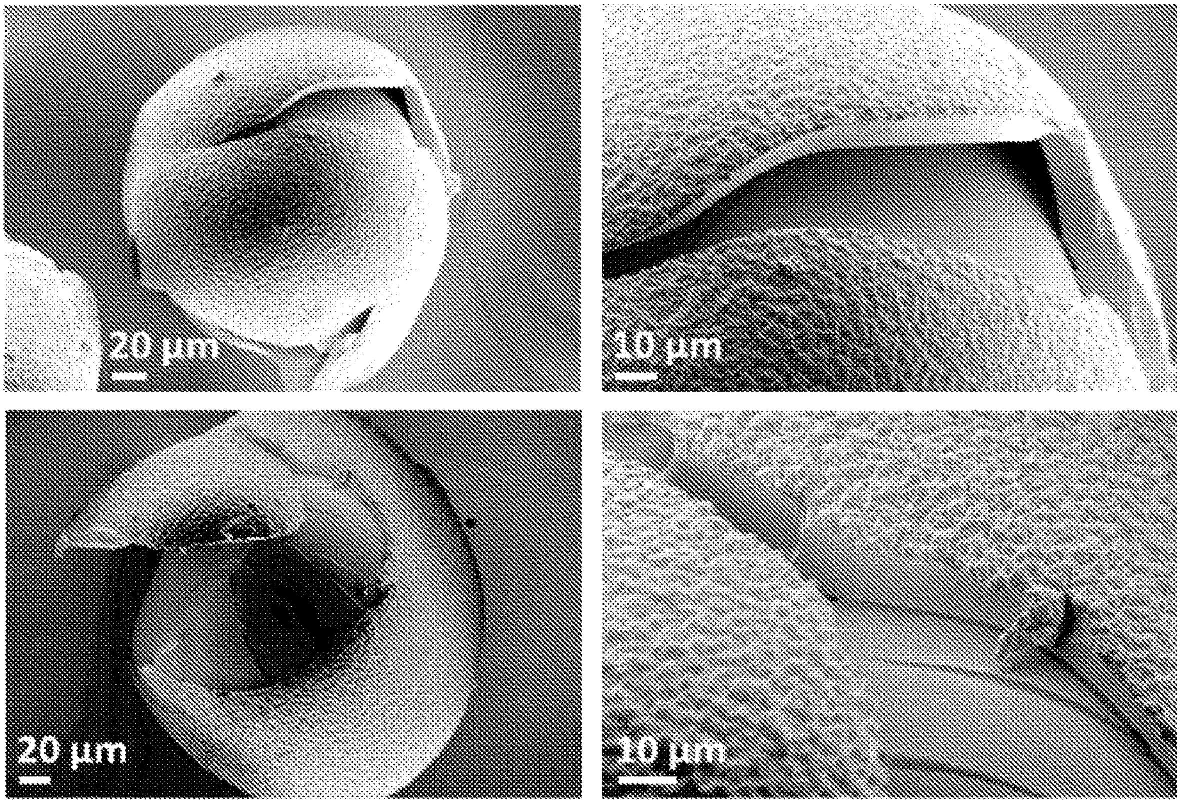
FIG. 6 shows SEM photographs of the AAm-APTMAC copolymer (R1) after vacuum drying in 65° C. and rewetting that cause delamination due to phase separation of the two growing polymers during polymerization.

It is important to note that copolymerization of the AAm with APTMAC without using the anionic surfactant, AOT would cause phase separation of the two monomers during polymerization due to the difference in the hydrophobicity of AAm and APTMAC. This phase separation can lead to severe delamination of the bead upon vacuum drying and rewetting, as can be seen in FIG. 6. This delamination confirms that AAm likely polymerized on the surface while APTMAC mostly remains inside of the polymer beads to minimize its interaction with the hydrophobic solvent (corn oil). Although this delamination can be avoided by eliminating the vacuum drying step, the phase separation of the PAAm and PAPTMAC is not desired to maintain the adsorption efficiency of the resin. To avoid this phase separation, and in order to synthesize more efficient and durable polymer beads, three strategies were explored, including excluding the AAm monomer (APTMAC homopolymers), the synthesis of IPNs (polymerization of APTMAC on the X-AAm beads), and using the anionic surfactant, AOT (resins R2 to R9, Table 1). All of these strategies aimed to ensure the presence of the PAPTMAC on the surface of the resin beads, which it was believed would increase the heparin adsorption efficiency of the sample.

Figure 7:
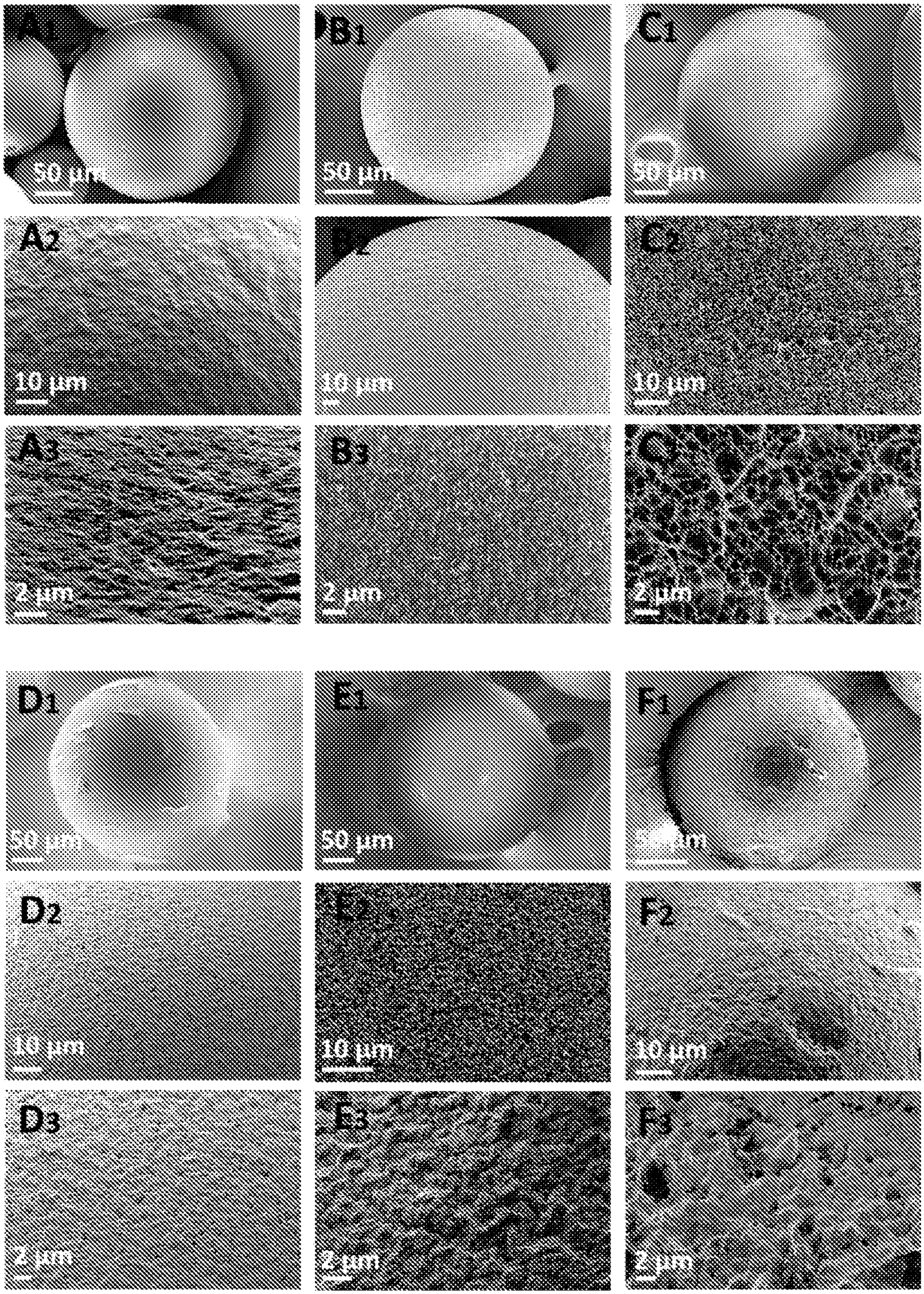
Figure 8:
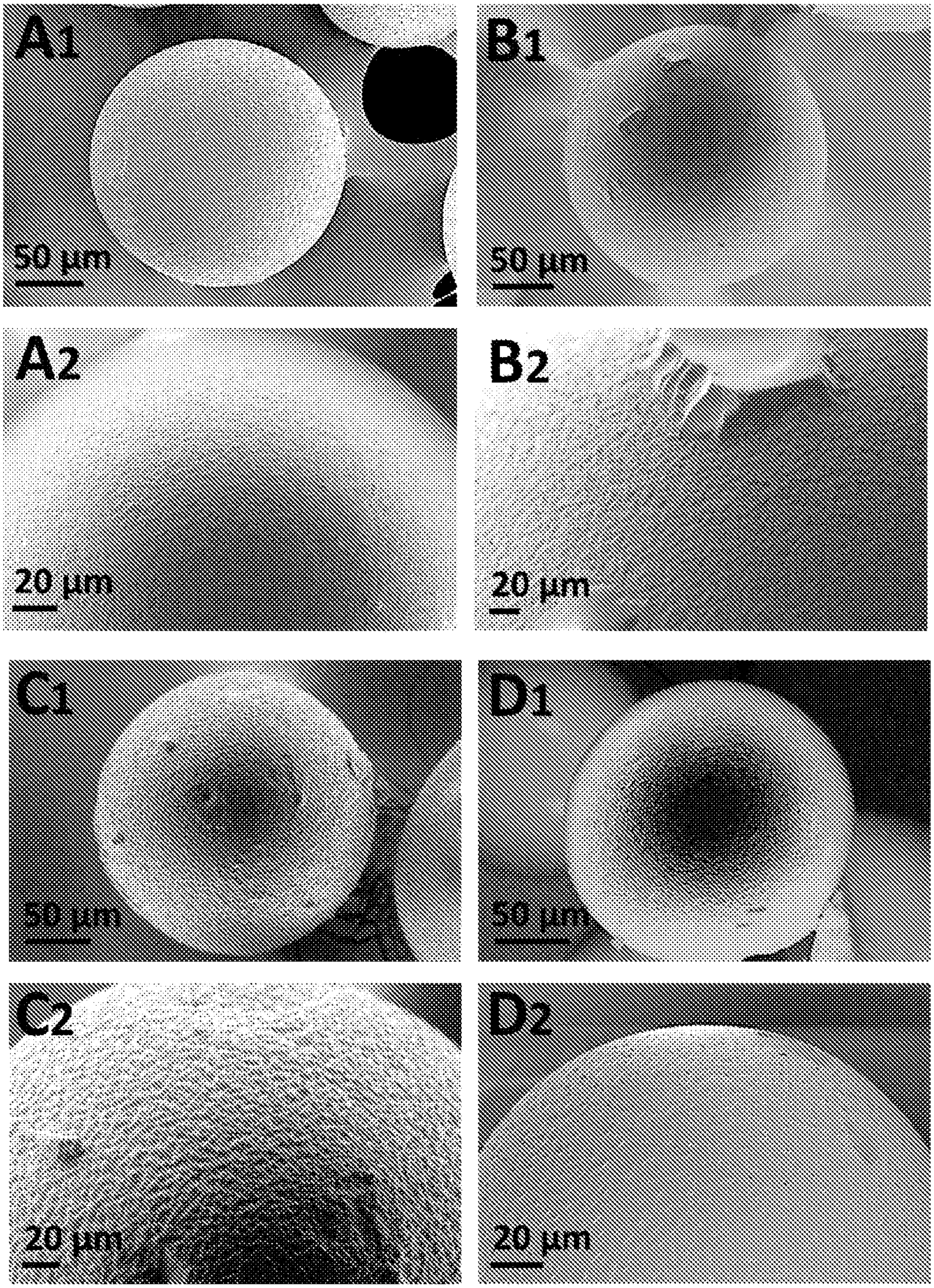

The surface morphology and roughness of the resin adsorbent is very important in terms of the resulting surface area, which can directly affect the adsorption efficiency. The shape and surface morphology of representative resins was investigated by SEM (FIGS. 7-8). The surface of the AAm-APTMAC copolymer, synthesized without using the AOT surfactant, is fairly smooth (resin R1, FIGS. 7A1-A3), with no evidence of a porous structure as well as the APTMAC homopolymer without AOT (resin R2, FIGS. 8A1-A2). Meanwhile, the APTMAC homopolymer resin was synthesized using the anionic surfactant AOT featured a rougher surface, though still non-porous (resin R4, FIGS. 7B1-B3). On the other hand, the X-AAm resin that was synthetized via inverse suspension polymerization (step 1, scheme 3), used as the core for the synthesis of IPN resins, showed a very rough and porous structure, as can be seen in FIGS. 7C1-C3. Polymerization of APTMAC inside the pores of such a core material results in a resin with a very rough surface that is less porous (resin R5, FIGS. 8B1-B2 and resin R6, FIGS. 7D1-D3). However, the highest roughness can be seen for the AAm-APTMAC copolymers that were synthesized using 2 wt % AOT (resin R9, FIGS. 7E1-E3). As shown in Table 1, this resin showed the highest activity for the eluted heparin compared to the other resins synthesized. The adsorbed heparin on this sample can be observed as an extra layer in FIGS. 7F1-F3. SEM micrographs of samples R2, R5, R7, and R8 are shown in FIGS. 8A1-A2, B1-B2, C1-C2, and D1-D2.

Figure 9:
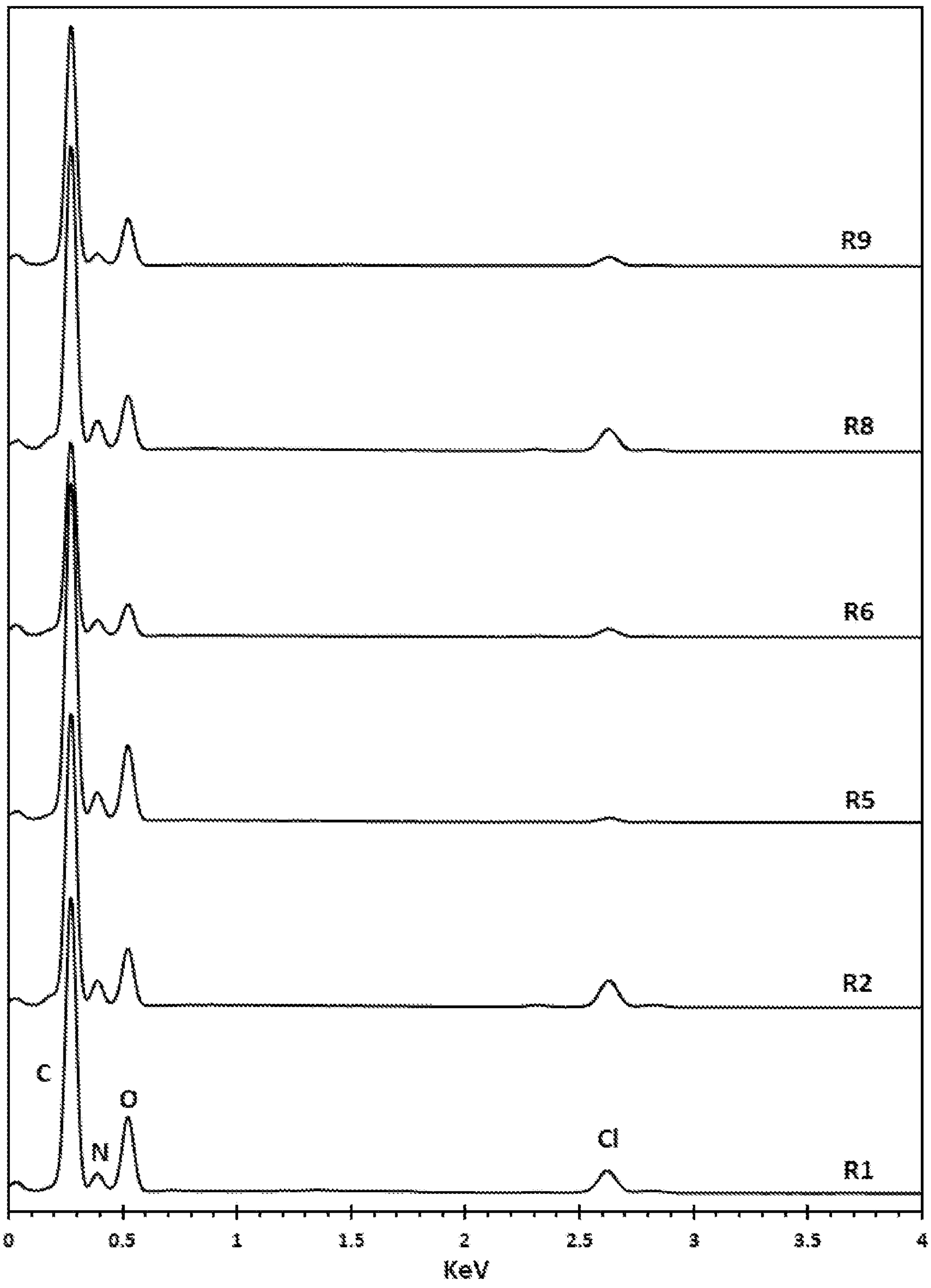
FIG. 9 shows EDS spectra of the selected resins at 10 kV, showing carbon, nitrogen, oxygen, and chlorine peaks.

Energy dispersive x-ray spectroscopy (EDS) was also performed on these resins to confirm the presence of the C, O, and N, as well as Cl (as the counter ion for the ammonium component of APTMAC) in their structure (FIG. 9).

$^1$H-NMR Spectroscopy of the Isolated Heparin from Resins

NMR spectroscopy has been used extensively to analyze the purity of crude heparin samples and/or the possible commercial heparin adulteration (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Linhardt et al., "Isolation and Characterization of Human Heparin," *Biochemistry* (*Mosc.*) 31(49):12441-12445 (1992); Beni et al., "Analysis and Characterization of Heparin Impurities," *Anal. Bioanal. Chem.* 399(2):527-539 (2011); Zang et al., "Combining $^1$H NMR Spectroscopy and Chemometrics to Identify Heparin Samples That May Possess Dermatan Sulfate (DS) Impurities or Oversulfated Chondroitin Sulfate (OSCS) Contaminants," *J. Pharm. Biomed. Anal.* 54(5):1020-1029 (2011); Keire et al., "Analysis of Crude Heparin by $^1$H NMR, Capillary Electrophoresis, and Strong-Anion-Exchange-HPLC for Contamination by Over Sulfated Chondroitin Sulfate," *J. Pharm. Biomed. Anal.* 51(4):921-926 (2010); Beyer et al., "Composition of OSCS-Contaminated Heparin Occurring in 2008 in Batches on the German Market," *Eur. J. Pharm. Sci.* 40(4):297-304. (2010); Bhaskar et al., "A Purification Process for Heparin and Precursor Polysaccharides Using the pH Responsive Behavior of Chitosan," *Biotechnol. Progr.* 31(5):1348-1359 (2015), which are hereby incorporated by reference in their entirety). FIGS. 10A-J show the 500 MHz $^1$H-NMR spectra of the crude heparin samples eluted and isolated from the synthesized resins compared to pharmaceutical grade heparin and crude heparin eluted and isolated from commercial Amberlite FPA98 Cl resin. All of the isolated heparin samples were solids with a white to pale brown color. As can be seen in FIGS. 10A-J, all of the heparin samples eluted from the synthesized resins showed the same characteristic peaks of the heparin isolated from the commercial Amberlite FPA 98Cl resin, which is slightly different from that of purified pharmaceutical grade heparin (FIG. 10A vs. 10B).

However, crude heparin from porcine mucosa contains dermatan sulfate (DS) and chondroitin sulfate (CS) as the major negatively charged impurities, which require further purification to enable the separated heparin for pharmaceutical use. The N-acetyl methyl region in the $^1$H-NMR spectra at ~2 ppm is of interest due to its importance for detecting these impurities as well as the heparin adulterant, oversulfated chondroitin sulfate (OSCS) (Beni et al., "Analysis and Characterization of Heparin Impurities," *Anal. Bioanal. Chem.* 399(2):527-539 (2011); Zang et al., "Combining $^1$H NMR Spectroscopy and Chemometrics to Identify Heparin Samples That May Possess Dermatan Sulfate (DS) Impurities or Oversulfated Chondroitin Sulfate (OSCS) Contaminants," *J. Pharm. Biomed. Anal.* 54(5):1020-1029 (2011); Keire et al., "Analysis of Crude Heparin by $^1$H NMR, Capillary Electrophoresis, and Strong-Anion-Exchange-HPLC for Contamination by Over Sulfated Chondroitin Sulfate," *J. Pharm. Biomed. Anal.* 51(4):921-926 (2010); Beyer et al., "Composition of OSCS-Contaminated Heparin Occurring in 2008 in Batches on the German Market," *Eur. J. Pharm. Sci.* 40(4):297-304. (2010), which are hereby incorporated by reference in their entirety). FIGS. 11A-J show the expanded $^1$H-NMR spectra of FIGS. 10A-J in the range of 1.96 to 2.18 ppm, which show the presence of DS and CS in all of the crude heparin samples from both the Amberlite FPA 98Cl as well as the synthesized resins. Table 2 shows the ratio between DS, heparin, and CS in each sample, which was calculated based on the integrals of each corresponding peak in FIG. 9 (the values are normalized so that the sum of them is 1.00). As can be seen in FIGS. 11A-J and Table 2, the heparin samples eluted from the synthesized resins are nearly the same as the heparin eluted from the Amberlite FPA 98Cl in terms of DS and CS impurities. The NMR results, combined with the results of the eluted heparin activity, show that the synthesized resins especially R8 and R9 are very effective and efficient for the recovery of heparin from the complex biological mixture of mucosa, which, besides DS and CS, contains many other competitive impurities, such as nucleic acids and proteins (van der Meer et al., "From Farm to Pharma: an Overview of Industrial Heparin Manufacturing Methods," *Molecules* 22(6):1025 (2017), which is hereby incorporated by reference in its entirety).

TABLE 2

Ratio Between DS, Heparin, and CS in Each Sample

| Crude heparin sample from: | CS peak integral at 2.02 | Heparin peak integral at 2.05 | DS peak integral at 2.08 | Total activity of eluted heparin U $g^{-1}$ |
|---|---|---|---|---|
| Amberlite FPA98 Cl | 0.17 | 0.59 | 0.24 | 55.0 ± 2.1 |
| R1 | 0.11 | 0.57 | 0.32 | 36.9 ± 1.6 |
| R2 | 0.15 | 0.55 | 0.30 | 44.0 ± 3.1 |
| R4 | 0.13 | 0.61 | 0.26 | 46.8 ± 2.9 |
| R5 | 0.14 | 0.58 | 0.28 | 42.4 ± 3.1 |
| R6 | 0.17 | 0.57 | 0.26 | 44.6 ± 2.8 |
| R7 | 0.11 | 0.60 | 0.29 | 45.7 ± 3.3 |
| R8 | 0.08 | 0.60 | 0.32 | 53.2 ± 3.5 |
| R9 | 0.12 | 0.61 | 0.27 | 64.7 ± 3.4[e] |

Effects of Some Experimental Variables on the Heparin Adsorption

Resin R9 (AAm-APTMAC copolymer synthesized using 2% anionic surfactant with 10% cross-linking) showed the best performance in terms of the activity (anticoagulant potency) of the eluted heparin (Table 1). As a result, this formulation was chosen to further investigate the effect of different heparin adsorption process variables, including resin dosage, pH, and time of adsorption, as well as evaluating the reusability of the resin in successive adsorption-desorption-regeneration cycles. All of the experiments were performed by utilization of the resin in the porcine intestinal mucosa as the real sample, and the amount of the heparin adsorbed by the resin was measured using the ELISA kit assay and/or by the sheep plasma test.

Effect of the Resin Dosage

FIG. 12A shows the effect of the resin dosage on the heparin uptake in the real sample. The dosage range was changed from 100 mg to 1000 mg, though the concentration of the heparin was kept constant during the measurements. The results showed that the adsorption efficiency increases with the increasing amount of resin until it reaches a maximum (47%) at 500 mg. This may be due to the increased surface and active adsorption sites of the resin with increasing dosage (Enayati et al., "One-Pot Synthesis of Cross-Linked Polymer Networks as a Hydrophilic Super-Adsorbent for Efficient Recovery of Heparin," *ACS Applied Polymer Materials* 1(2):230-238 (2019); Arshadi et al., "Highly Water-dispersible and Antibacterial Magnetic Clay Nanotubes Functionalized with Polyelectrolyte Brushes: High Adsorption Capacity and Selectivity Toward Heparin in Batch and Continuous System," *Green Chem.* 20(24): 5491-5508 (2018), which are hereby incorporated by reference in their entirety). The adsorption efficiency remained constant in the 500-1000 mg dosage range. This means the addition of excess resin would not affect the adsorption efficiency after a certain dosage most likely due to the faster decrease in the heparin concentration as it reaches a steady state. The adsorption capacity of the heparin on the resin also increased with increasing resin dosage, reaching maximum at 22.5 mg $g^{-1}$ (for 500 mg). However, the adsorption capacity decreased from 22.5 mg $g^{-1}$ to 11.4 mg $g^{-1}$ with the resin dosage increase due to the increase in mass (m) of the resin according to the adsorption capacity equation.

Effect of pH

The heparin digestion process was done at basic pHs, typically between 9 to 10 (van der Meer et al., "From Farm to Pharma: an Overview of Industrial Heparin Manufacturing Methods," *Molecules* 22(6):1025 (2017), which is hereby incorporated by reference in its entirety), in order to maximize the concentration of the released heparin. However, the heparin adsorption process can be performed at different pHs. The effect of the pH on heparin adsorption was tested by changing the pH of the real sample solution from 3 to 10. As shown in FIG. 12B, by increasing the pH, both the adsorption efficiency and adsorption capacity of the resin increase from 6.5 mg $g^{-1}$ (13.6%) to 22.9 mg $g^{-1}$ (47.7%). This may be the result of the deprotonation of the heparin, which increases the negative charge and subsequently makes them available to adsorb by the positive active sites of the resin. Since the performance of the resin is practically the same for pH values of 8.0 and higher (FIG. 12B), it is concluded that the best performance of the heparin uptake should occur at between pH 8.0 and 9.0 as the long-term stability of the resin would decrease dramatically at higher pHs.

Effect of Adsorption Process Time

The effect of the absorption time (i.e., the time of contact between the aqueous mucosa solution and resin beads) on the heparin adsorption over a period of 450 min was also explored. The results are shown in FIG. 12C, which indicate that both the adsorption efficiency and adsorption capacity increase over time, peaking at ~240 min (22.7 mg $g^{-1}$ and 47.2% respectively), after which the amount of adsorbed heparin remains constant. The high adsorption rate could be due to the higher number of active sites of the resin during the first 240 min of the experiment, which eventually become saturated by the heparin molecules.

Reusability and Stability Results

In designing any adsorbent resin, it is important to consider both the material's stability and reusability for industrial use for both economic and environmental reasons (Zhao et al., "Magnetic Nanocomposites Derived From Hollow ZIF-67 and Core-Shell ZIF-67@ ZIF-8: Synthesis, Properties, and Adsorption of Rhodamine B," *Eur. J. Inorg. Chem.* 2017(35):4110-4116 (2017), which is hereby incorporated by reference in its entirety). After heparin adsorption from real sample and elution, the resin was regenerated by washing with NaOH solution (5.0 w %) for 3 hours at 50° C. followed by washing with Milli-Q water. FIG. 12D shows the reusability of the R9 resin through five consecutive adsorption-desorption-regeneration cycles. The adsorption process was continued for 15 hours, in which after that the desorption and regeneration both take 5 hours to complete. Results show that both the adsorption efficiency and adsorption capacity slightly increase between cycles 1 to 4, then remain relatively constant after that. The same trend was observed for commercial Amberlite FPA98 Cl resin. The reason might be related to the washing and regeneration process. The resins were washed and regenerated at 50° C. using NaOH and saturated NaCl solutions several times for several hours. The process might open new channels and expand the pore sizes in the resin, possibly leading to the higher adsorption efficiency and adsorption capacity for the first few runs. These results indicate the stability and reusability of the resin even after the relatively harsh conditions of heparin adsorption from a real biological sample.

CONCLUSIONS

A green route for the synthesis of spherical cross-linked resins containing the quaternary ammonium salt functionality as a potential anion exchange resin for heparin adsorption is described. Inverse suspension polymerization in corn oil was used to synthesize the spherical resins that featured a mean diameter of ~500 μm. In order to avoid the phase separation of AAm-APTMAC during the droplet copolymerization, three approaches were explored, including homopolymerization of APTMAC, IPN synthesis using APTMAC as the second monomer that was polymerized inside the pores of X-AAm core beads, and using an anionic surfactant to promote the presence of the APTMAC functionality on the outer surface of the resin. All of these resins were tested for adsorption of heparin from a real sample of porcine mucosa and isolated and evaluated the crude heparin was eluted from these materials in order to study their anticoagulant potency as well as impurity contents, as assessed by NMR spectroscopy. The total anti-coagulant activity of the eluted heparin from these resins ranged from 37 to 65 U $g^{-1}$ compared to the mean value of 55 U $g^{-1}$ eluted from the commercial Amberlite FPA98 Cl (Table 1). NMR spectroscopy showed the presence of other negatively charged GAGs (i.e. DS and CS) as heparin contaminants, which was also the case for Amberlite FPA98 Cl. A resin with the best performance (R9) was selected to evaluate the adsorption process variables, including the resin dosage, pH, and adsorption time. Results showed that the optimum dosage of the resin was 10 wt % in relation to the mucosa, while the optimum pH for the adsorption process was 8.0-9.0, and the minimum time needed to reach the maximum adsorption was 4 hours. The adsorption efficiency of the selected resin, R9, was measured and its capacity for heparin adsorption was found to be 43% and 26 mg $g^{-1}$, while these values were 34% and 20.4 mg $g^{-1}$ for the commercial Amberlite FPA98 Cl resin. Furthermore, the performance of the resin in five consecutive heparin adsorption-desorption runs of the biological sample showed the resin can be used repeatedly for heparin adsorption without critical decrease in its performance. Overall, these results show that the proposed resins synthesized can be used to increase the heparin recovery from the biological sources.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A polymerizable composition comprising:

(a) a first monomer of Formula (I):

(I)

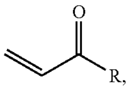

, wherein

R is selected from the group consisting of $NH_2$, $NHR^1$, $NR^1R^2$, —NH-A-$NR^1R^2$,

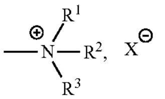 and 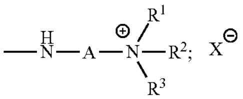

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen; and (b) a second monomer of Formula (II):

(II)

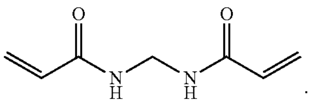

.

2. One or more adsorbent beads produced by polymerizing the composition of claim 1.

3. The one or more adsorbent beads of claim 2 comprising the following structure:

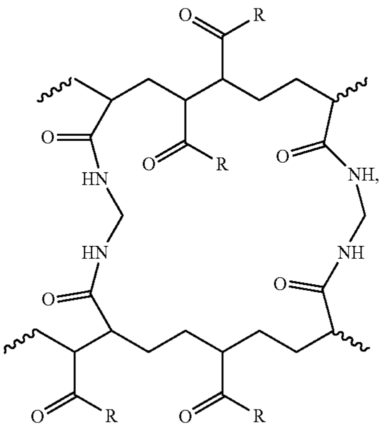

wherein  represents points of attachment to other polymerized monomers.

4. A process for the production of one or more adsorbent beads comprising:

providing a first monomer of Formula (I):

(I)

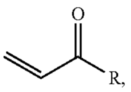

wherein

R is selected from the group consisting of $NH_2$, $NHR^1$, $NR^1R^2$, —NH-A-$NR^1R^2$,

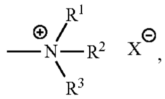 , and 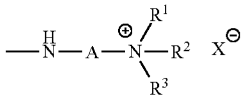 ;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen;

providing a second monomer of Formula (II):

(II)

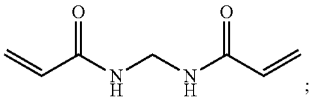

;

and polymerizing the first monomer of Formula (I) and the second monomer of Formula (II) under conditions effective to produce one or more adsorbent beads.

5. A polymerizable composition comprising:

(a) the one or more adsorbent beads of claim 2;

(b) a second monomer of Formula (II):

(II)

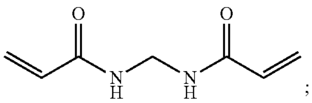

;

and (c) a third monomer of Formula (III):

(III)

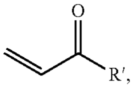

wherein

R' is selected from the group consisting of $NH_2$, $NHR^{1'}$, $NR^{1'}R^{2'}$, —NH-A-$NR^{1'}R^{2'}$,

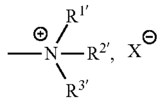 and 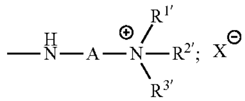

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen.

6. One or more adsorbent beads produced by polymerizing the composition of claim 5.

7. A process for the production of a one or more modified adsorbent beads comprising:

providing the one or more adsorbent beads of claim 2;

providing a second monomer of Formula (II):

(II)

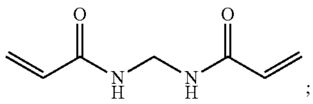

;

providing a third monomer of Formula (III):

(III)

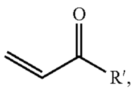

wherein

R'is selected from the group consisting of $NH_2$, $NHR^{1'}$, $NR^{1'}R^{2'}$, —NH-A-$NR^{1'}R^{2'}$,

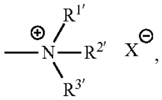 , and 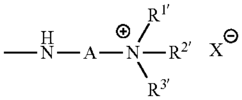 ;

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen; and polymerizing the one or more adsorbent beads, the second monomer of Formula (II), and the third monomer of Formula (III) to produce one or more modified adsorbent beads.

8. The polymerizable composition of claim 1 further comprising:

a third monomer of Formula (III):

(III)

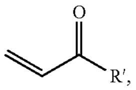

wherein

R'is selected from the group consisting of $NH_2$, $NHR^{1'}$, $NR^{1'}R^{2'}$, —NH-A-$NR^{1'}R^{2'}$,

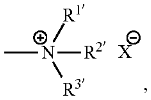 , and 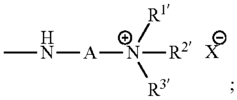 ;

$R^{1'}$ is H or $C_{1-6}$ alkyl;

$R^{2'}$ is H or $C_{1-6}$ alkyl;

$R^{3'}$ is H or $C_{1-6}$ alkyl;

A is $C_{1-6}$ alkylene which can be optionally substituted with $C_{1-6}$ alkyl; and X is halogen, wherein the third monomer of Formula (III) is different from the first monomer of Formula (I).

9. One or more adsorbent beads produced by polymerizing the composition of claim 8.

10. A process for the production of one or more modified adsorbent beads comprising:

providing the polymerizable composition of claim 8; and polymerizing the polymerizable composition to produce one or more modified adsorbent beads.

11. The composition of claim 1, wherein the first monomer of Formula (I) is acrylamide (AAm).

12. The composition of claim 1, wherein the second monomer of Formula (II) is N,N'-methylenebisacrylamide (BisAAm).

13. The composition of claim 1, wherein the first monomer of Formula (I) is present in the composition in an amount of from 5 to 75% by weight.

14. The composition of claim 1, wherein the second monomer of Formula (II) is present in the composition in an amount of from 5 to 75% by weight.

15. One or more adsorbent beads comprising a polymerized first monomer of Formula (I)

(I)

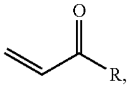

wherein

R is selected from the group consisting of $NH_2$, $NHR^1$, $NR^1R^2$, —NH-A-$NR^1R^2$,

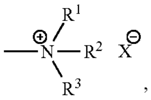 , and 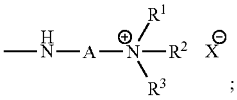 ;

$R^1$ is H or $C_{1-6}$ alkyl;

$R^2$ is H or $C_{1-6}$ alkyl;

$R^3$ is H or $C_{1-6}$ alkyl;

A is $C_{1-6}$ alkylene which can be optionally substituted with $C_{1-6}$ alkyl; and X is halogen.

16. The one or more adsorbent beads according to claim 2, wherein the diameter of the adsorbent beads is from about 10 μm to about 5 mm.

17. The one or more adsorbent beads according to claim 2, wherein the diameter of the adsorbent beads is from about 250 μm to about 1200 μm.

* * * * *